United States Patent [19]

Yamamoto

[11] Patent Number: 5,699,177
[45] Date of Patent: Dec. 16, 1997

[54] COMMUNICATION METHOD IN NETWORK SYSTEM FOR PERFORMING INFORMATION TRANSMISSION AMONG TERMINAL EQUIPMENTS USING LIGHT BEAMS OF A PLURALITY OF WAVELENGTHS, TERMINAL EQUIPMENT USED IN THE METHOD AND NETWORK SYSTEM USING THE METHOD

[75] Inventor: Mitsuru Yamamoto, Yokohama, Japan

[73] Assignee: Canon Kabushiki Kaisha, Tokyo, Japan

[21] Appl. No.: 677,791

[22] Filed: Jul. 10, 1996

Related U.S. Application Data

[63] Continuation of Ser. No. 230,782, Apr. 21, 1994, abandoned.

[30] Foreign Application Priority Data

| Apr. 23, 1993 | [JP] | Japan | 5-97741 |
| May 28, 1993 | [JP] | Japan | 5-126795 |
| Apr. 14, 1994 | [JP] | Japan | 6-75754 |

[51] Int. Cl.[6] .................. H04J 14/02; H04B 10/20
[52] U.S. Cl. .................. 359/125; 359/119; 359/124; 359/127; 359/165
[58] Field of Search .................. 359/124, 125, 359/119, 118, 117; 370/73, 76, 71, 85.5

[56] References Cited

U.S. PATENT DOCUMENTS

| 4,947,389 | 8/1990 | Eng et al. | 370/85.5 |
| 5,289,302 | 2/1994 | Eda | 359/124 |
| 5,319,485 | 6/1994 | Yasui et al. | 359/125 |
| 5,365,344 | 11/1994 | Eda et al. | 359/124 |
| 5,369,515 | 11/1994 | Majima | 359/119 |

FOREIGN PATENT DOCUMENTS 3807072 8/1988 Germany .

OTHER PUBLICATIONS

Network Architecture, TeraNet; a mutli-gigabits per second ATM network by Rafael Gidron, vol. 15, No. 3, April 1992, pp. 143–152.

Performance Analysis of Multihop Lightwave Networks with Hot Potato Routing and Distance–Age–Priorities by Zhensheng Zhang and Anthony S. pp. 1012–1021.

Multiwavelength Ring Networks for Switch Consolidation and Interconnection by Stuart S. Wagner and Thomas E. Chapuran, Jun. 14, 1992, pp. 1173–1179.

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

A network system includes a wavelength-multiplexing transmission path for multiplexing and transmitting a plurality of wavelengths, and a plurality of terminal equipments connected to the transmission path. A transmission wavelength and a reception wavelength are assigned in advance to each of the plurality of terminal equipments. When data must be transmitted between the terminal equipments, and when a transmission wavelength of a transmission source terminal equipment as a transmission source of the data is diffenrent from a reception wavelength of a destination terminal equipment as a destination of the data, wavelength conversion is performed such that a terminal equipment located between the transmission source terminal equipment and the destination terminal equipment temporarily receives the data, and transmits the data at another wavelength.

28 Claims, 13 Drawing Sheets

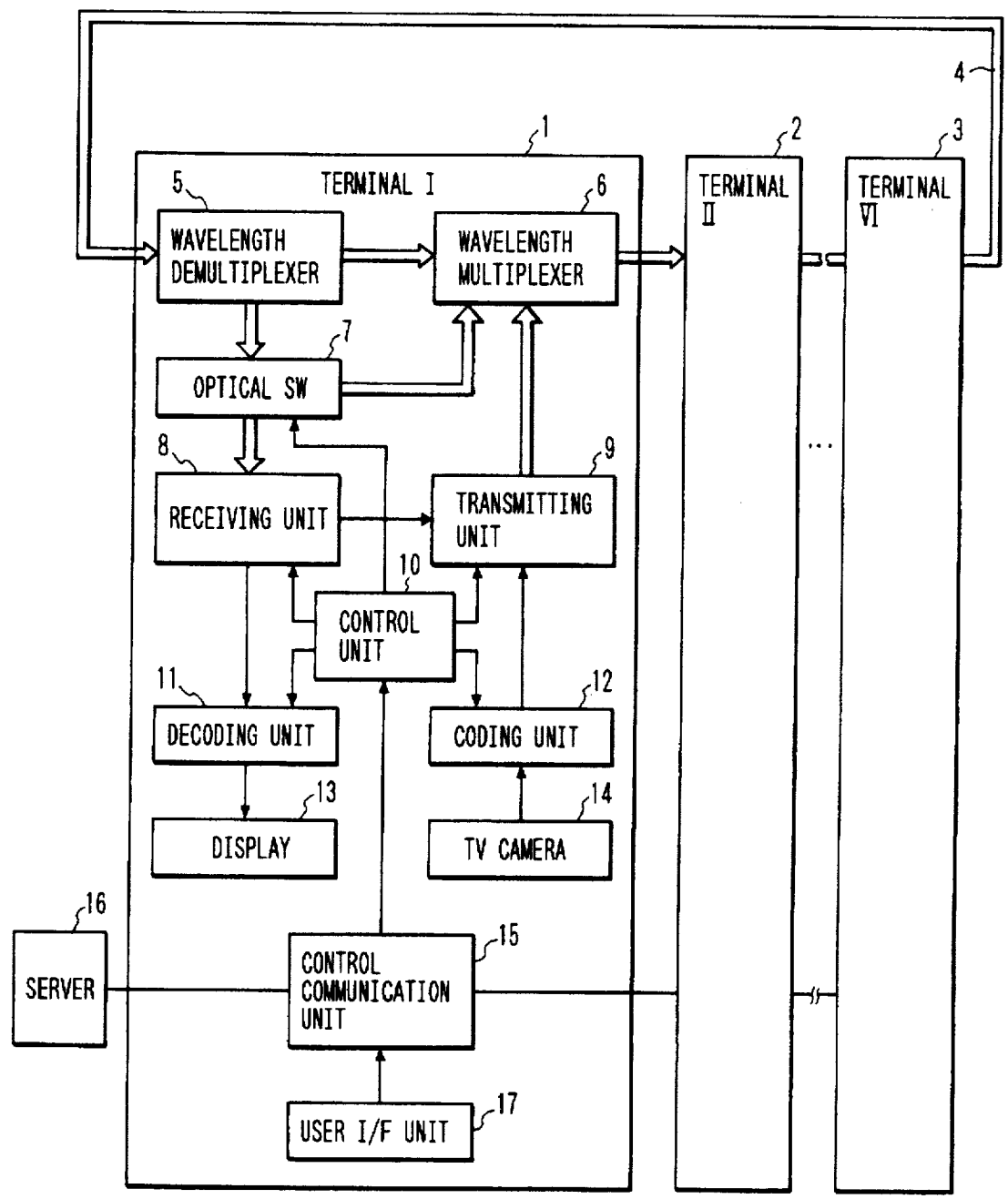

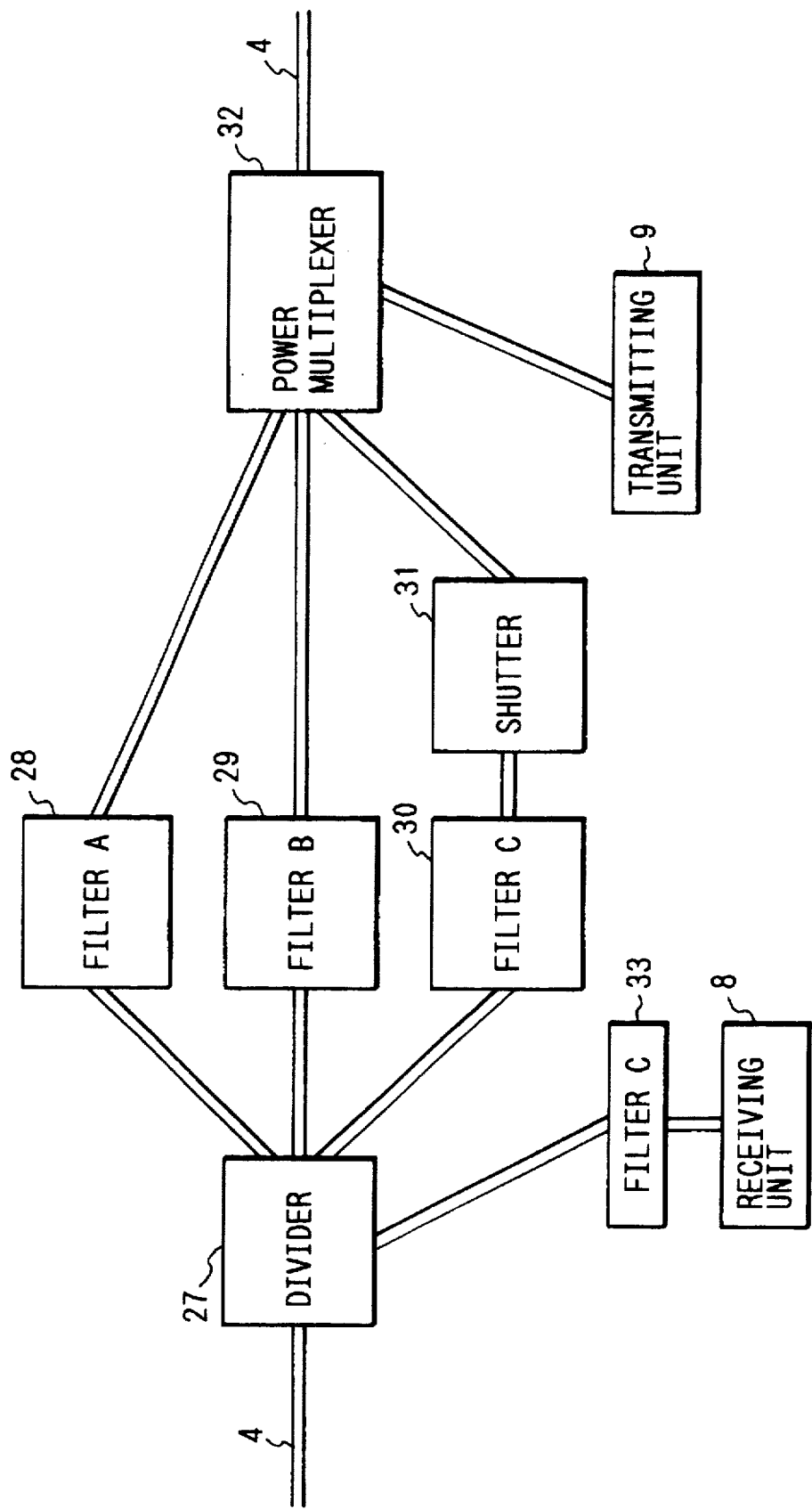

COMMUNICATION METHOD IN NETWORK SYSTEM FOR PERFORMING INFORMATION TRANSMISSION AMONG TERMINAL EQUIPMENTS USING LIGHT BEAMS OF A PLURALITY OF WAVELENGTHS, TERMINAL EQUIPMENT USED IN THE METHOD AND NETWORK SYSTEM USING THE METHOD

This application is a continuation of application Ser. No. 08/230,782, filed Apr. 21,1994, now abandoned.

BACKGROUND OF THE INVENTION

1. Field of the Invention

The present invention relates to a terminal equipment used in optical communications and a network system for performing optical communications and, more particularly, to a network system for performing information transmission among terminal equipments using a plurality of wavelengths.

2. Related Background Art

As a conventional dynamic image network system, for example, an optical ring network having the arrangement shown in FIG. 1 comprises a video camera 176 as a dynamic image signal source, a display 177 as a dynamic image output device, and a terminal 178 connected to the video camera and the display. The terminal 178 has a function of coding a dynamic image signal from the video camera to a desired digital signal, and outputting the digital signal to a network interface 179, and a function of decoding a digital signal input from the network interface 179, and inputting the decoded signal to the dynamic image output device.

The network interface 179 has a function of checking a slot which circulates on the optical ring network shown in FIG. 1, and inserting a digital signal output from the terminal into an empty channel, and a function of reading out a digital signal from a channel addressed to the own terminal. Note that an optical fiber 180 is used as a transmission path of an optical signal which is transmitted along the optical ring network.

Furthermore, as the second prior art of a dynamic image network of this type, a dynamic image network system with a broad transmission bandwidth adopts an arrangement in which a plurality of terminals are connected to an optical fiber 181 as a ring-shaped optical transmission path for transmitting optical signals of a plurality of wavelengths, as shown in, e.g., FIG. 2.

Referring to FIG. 2, a divider 183 divides an optical signal transmitted on the optical fiber 181 into optical signals sent to a plurality of (m) fixed wavelength filters 1 to m 191, and a power multiplexer 184. The power multiplexer 184 multiplexes an optical signal emerging from the divider 183 and optical signals output from a plurality of (m) fixed wavelength lasers 1 to m 193, and outputs the multiplexed signal onto the optical fiber 181.

The fixed wavelength filters 1 to m each pass only a corresponding one of wavelength-multiplexed optical signals $\lambda_1$ to $\lambda_m$ therethrough, and output the signals to corresponding O/E converters 1 to m 192. The O/E converters 1 to m respectively convert the input optical signals into electrical signals, and output the electrical signals to an SWI 194.

The SWI 194 selects only an electrical signal assigned to the own terminal from those output from the m O/E converters under the control of a control unit 188, and outputs the selected signal as a reception signal. An SWII 195 outputs a transmission signal, to the fixed wavelength laser which is to transmit the transmission signal, in accordance with an instruction from the control unit. Of the m fixed wavelength lasers 193, only the fixed wavelength laser which receives the transmission signal from the SWII 195 emits the transmission signal as an optical signal of a predetermined wavelength. The transmission wavelengths of the fixed wavelength lasers 1 to m respectively correspond to optical wavelengths $\lambda_1$ to $\lambda_m$ which are wavelength-multiplexed in this arrangement.

The control unit 188 controls to select one of the outputs from the plurality of O/E converters input to the SWI as a reception signal and to select the fixed wavelength laser for outputting a transmission signal, in accordance with an instruction from a server 190, which instruction is output from a communication control unit 189.

The server 190 determines a transmission permission/inhibition mode, and wavelengths to be used in the transmission permission mode on the basis of transmission permission requests sent from terminals, and wavelengths used on the network, and instructs them to the respective terminals. Each terminal controls the SWI and SWII to use the wavelength designated by the server, and operates to perform desired communications.

As the third prior art of a dynamic image network of this type, a system using a terminal equipment shown in FIG. 3 is known. The same reference numerals in FIG. 3 denote the same parts as in FIG. 2.

Referring to FIG. 3, a divider 183 divides an optical signal transmitted on an optical fiber 181 into signals destined to a tunable filter 185 and a power multiplexer 184. The power multiplexer 184 multiplexes an optical signal emerging from the divider 183 and an optical signal emitted from a tunable laser 186, and outputs the multiplexed signal onto the optical fiber 181.

The tunable filter 185 is a filter which utilizes a change in refractive index caused by current injection, and passes only a specific wavelength of an optical signal of a plurality of wavelengths emerging from the divider 183 therethrough in accordance with an instruction from a control unit 188. Also, the tunable laser 186 is a laser which utilizes a change in refractive index caused by current injection, converts a transmission signal into an optical signal of a specific wavelength in accordance with an instruction from the control unit 188, and outputs the converted signal to the power multiplexer 184.

The control unit 188 controls the passing wavelength of the tunable filter 185 and the oscillation wavelength of the tunable laser 186 in accordance with an instruction from a server 190, which instruction is output from a communication control unit 189. The communication control unit 189 communicates control signals such as a transmission permission request to the server 190, an assigned wavelength instruction from the server 190, and the like.

The server 190 determines a transmission permission/inhibition mode, and wavelengths to be used in the transmission permission mode on the basis of transmission permission requests sent from terminals, and wavelengths used on the network, and instructs them to the respective terminals. Each terminal controls the tunable filter 185 and the tunable laser 186 to use the wavelength designated by the server, and operates to perform desired communications.

However, in the conventional optical ring network, since a single channel on a slot is solely assigned for transmission of a single dynamic image signal, if all the channels are busy, the transmission request of a newly generated dynamic image signal is waited until the use of any one channel ends, resulting in poor response characteristics to the transmission request. For this reason, the conventional network is not suitable for transmission of large-capacity continuous data such as dynamic image data.

In order to solve the above-mentioned problem, a method of realizing transmission of dynamic image signals surpassing the number of channels by sequentially changing the rights of use of channels for every predetermined time period is proposed. However, in this case, every time the right of use of a channel is lost, a dynamic image signal is disconnected.

Furthermore, in the dynamic image networks of the second and third prior arts shown in FIGS. 2 and 3, the number of transmission channels of dynamic images can be increased, but the networks then suffer from the following problems.

More specifically, since the wavelength used by a pair of transmitting and receiving terminals is assigned by the server from non-used wavelengths in the network system at that time, a different wavelength is used in every transmission/reception in accordance with the operating state of the network system. For this reason, in order to realize communications among all the terminals, all the terminals must have transmission/reception functions for all the wavelengths used in the network system. As a result, each terminal must have complicated transmitting and receiving units, resulting in high device cost. More specifically, in the second prior art, each terminal must comprise the fixed wavelength filters, O/E converters, and fixed wavelength lasers corresponding in number to all the wavelengths. In the third prior art, the transmission wavelength of the tunable laser in a transmitting terminal must be caused to strictly coincide with the passing wavelength of the tunable filter in a receiving terminal. However, the transmission wavelength of the tunable filter has a large temperature dependency, and varies by about 0.1 nm when the temperature changes by about 1° C. For this reason, the stability of the temperature must be suppressed to 0.1° C. or less, resulting in a large-scale temperature control mechanism therefor.

Furthermore, in either arrangement of the second and third prior arts, in order to start a communication, a communication permission/inhibition mode and a wavelength to be used in the communication permission mode must be designated by the server. Therefore, the time required for performing a communication with the server, and for executing processing for deciding the communication permission/ inhibition mode and assigning a wavelength to be used in the server results in a delay time until an actual communication is started.

Furthermore, in either arrangement of the second and third prior arts, an optical signal of one wavelength transmitted from a single terminal is input to all the terminals connected to the network. For this reason, a plurality of terminals cannot simultaneously perform communications using a single wavelength, and the number of terminals which can perform transmission at the same time can never exceed the number of multiplexed wavelengths.

SUMMARY OF THE INVENTION

It is an object of the present invention to provide a wavelength-multiplexing network system with a simple arrangement, which can solve the above-mentioned problems, can effectively utilize a transmission band, can improve response characteristics to a transmission request of a dynamic image signal, and can prevent disconnection of a signal to be transmitted, and a terminal equipment used therefor.

In order to achieve the above object, according to the present invention, there are provided the following system and devices.

A terminal equipment used in a network system constituted by a wavelength-multiplexing transmission path for multiplexing and transmitting a plurality of wavelengths, and a plurality of terminal equipments connected to transmission path, comprising:

passing/fetching means which can select whether an optical signal of a reception wavelength, assigned in advance to the terminal equipment, of optical signals of a plurality of wavelengths on the wavelength-multiplexing transmission path is fetched into the terminal equipment and is shielded from the wavelength-multiplexing transmission path, or is allowed to pass therethrough without being fetched into the terminal equipment;

receiving means for receiving the optical signal of the reception wavelength which is fetched by the passing/ fetching means; and transmitting means for transmitting, a signal to be transmitted onto the wavelength-multiplexing transmission path, at a transmission wavelength assigned in advance to the terminal equipment.

A network system comprising:

a wavelength-multiplexing transmission path for multiplexing and transmitting a plurality of wavelengths;

control arbitration means for permitting/inhibiting communications among a plurality of terminal equipments connected to the wavelength-multiplexing transmission path, and controlling operations of the terminal equipments; and the plurality of terminal equipments connected to the wavelength-multiplexing transmission path, each of the terminal equipments comprising:

passing/fetching means which can select whether an optical signal of a reception wavelength, assigned in advance to each of the plurality of terminal equipments, of optical signals of a plurality of wavelengths on the wavelength-multiplexing transmission path is fetched into each of the plurality of terminal equipments and is shielded from the wavelength-multiplexing transmission path, or is allowed to pass therethrough without being fetched into each of the plurality of terminal equipments;

receiving means for receiving the optical signal of the reception wavelength which is fetched by the passing/fetching means; and transmitting means for transmitting, a signal to be transmitted onto the wavelength-multiplexing transmission path, at a transmission wavelength assigned in advance to each of the plurality of terminal equipments. A communication method for a network system which comprises a wavelength-multiplexing transmission path for multiplexing and transmitting a plurality of wavelengths, a plurality of terminal equipments which are connected to the transmission path and to each of which reception and transmission wavelengths are assigned in advance, and control arbitration means for permitting/inhibiting communications among the plurality of terminal equipments connected to the wavelength-multiplexing transmission path, and controlling the plurality of terminal equipments, comprising the steps of:

issuing a transmission path acquisition request, to the control arbitration means, from the terminal equipment which must transmit data, and in which the transmission path acquisition request is generated;

setting, in the control arbitration means which received the transmission path acquisition request, a transmission path on the basis of results of examining, based on the transmission wavelength of the terminal equipment as a transmission source of the data, the reception wavelength of the terminal equipment as a destination of the data, the reception and transmission wavelengths of a terminal equipment present between the two terminal equipments, and a use state of the wavelength-multiplexing transmission path, whether or not wavelength conversion for temporarily receiving the data by a terminal equipment between the transmission source terminal equipment and the destination terminal equipment and transmitting the received data at another wavelength must be performed, and in which of the terminal equipments the wavelength conversion is performed if the wavelength conversion must be performed;

sending a transmission path acquisition inhibition message from the control arbitration means to the terminal equipment which issued the transmission path acquisition request when it is impossible for the control arbitration means to set the transmission path; and executing the following control operations in the control arbitration means for the terminal equipments on the transmission path when it is possible for the control arbitration means to set the transmission path.

(a) sending a transmission instruction to the transmission source terminal equipment, (b) controlling the destination terminal equipment to receive data transmitted from an upstream side of the transmission path at the reception wavelength of the destination terminal equipment by fetching and shielding the data from the transmission path;

(c) controlling the terminal equipment which is to execute the wavelength conversion to temporarily receive the data by fetching and shielding the data from the transmission path, and to transmit the received data at another wavelength when it is determined on the basis of results of examining that the wavelength conversion must be performed; and (d) controlling the terminal equipments which are located along the transmission path of the data transmitted at the reception wavelength of the terminal equipments from an upstream side and do not execute the wavelength conversion to pass the data therethrough without fetching the data.

A terminal equipment used in a network system constituted by a wavelength-multiplexing transmission path for multiplexing and transmitting a plurality of wavelengths, and a plurality of terminal equipments connected to the transmission path, comprising:

fetching means for fetching an optical signal of a reception wavelength, assigned in advance to the terminal equipment, of optical signals of a plurality of wavelengths on the wavelength-multiplexing transmission path, and shielding the fetched optical signal from the wavelength-multiplexing transmission path;

receiving means for receiving the fetched optical signal of the reception wavelength;

first transmitting means for transmitting data at a first transmission wavelength assigned in advance to the terminal equipment;

second transmitting means for transmitting data at a second transmission wavelength, different from the first transmission wavelength, assigned in advance to the terminal equipment;

memory means for storing data to be transmitted; and transmission wavelength determining means for determining whether the data to be transmitted is transmitted at the first or second transmission wavelength.

A network system comprising:

a wavelength-multiplexing transmission path for multiplexing and transmitting a plurality of wavelengths; and a plurality of terminal equipments connected to the transmission path, each of the plurality of terminal equipments comprising:

fetching means for fetching an optical signal of a reception wavelength, assigned in advance to each of the plurality of terminal equipments, of optical signals of a plurality of wavelengths on the wavelength-multiplexing transmission path, and shielding the fetched optical signal from the wavelength-multiplexing transmission path;

receiving means for receiving the fetched optical signal of the reception wavelength;

first transmitting means for transmitting data at a first transmission wavelength assigned in advance to each of the plurality of terminal equipments;

second transmitting means for transmitting data at a second transmission wavelength, different from the first transmission wavelength, assigned in advance to each of the plurality of terminal equipments;

memory means for storing data to be transmitted; and transmission wavelength determining means for determining whether the data to be transmitted is transmitted at the first or second transmission wavelength.

A terminal equipment used in a network system constituted by a wavelength-multiplexing transmission path for multiplexing and transmitting a plurality of wavelengths, and a plurality of terminal equipments connected to the transmission path, comprising:

receiving means for receiving optical signals of two or more reception wavelengths assigned in advance to the terminal equipment, of optical signals of a plurality of wavelengths on the wavelength-multiplexing transmission path by fetching and shielding the optical signals of the two or more reception wavelengths from the wavelength-multiplexing transmission path, the receiving means comprising means for independently receiving the two or more reception wavelengths;

transmitting means for transmitting data at two or more transmission wavelengths assigned in advance to the terminal equipment, the transmitting means comprising means for independently transmitting the two or more transmission wavelengths;

memory means for storing data to be transmitted; and transmission wavelength determining means for determining the transmission wavelength for transmitting the data from the two or more transmission wavelengths.

A network system comprising:

a wavelength-multiplexing transmission path for multiplexing and transmitting a plurality of wavelengths; and a plurality of terminal equipments connected to the transmission path, each of the plurality of terminal equipments comprising:

receiving means for receiving optical signals of two or more reception wavelengths, assigned in advance to each of the plurality of terminal equipments, of optical signals of a plurality of wavelengths on the wavelength-multiplexing transmission path by fetching and shielding the optical signals of the two or more reception wavelengths from the wavelength-multiplexing transmission path, the receiving means comprising means for independently receiving the two or more reception wavelengths;

transmitting means for transmitting data at two or more transmission wavelengths assigned in advance to each of the plurality of terminal equipments, the transmitting means comprising means for independently transmitting the two or more transmission wavelengths; memory means for storing data to be transmitted; and transmission wavelength determining means for determining the transmission wavelength for transmitting the data from the two or more transmission wavelengths.

BRIEF DESCRIPTION OF THE DRAWINGS

FIG. 4 is a diagram showing the arrangement of a network system according to the first embodiment of the present invention;

FIG. 7 is a diagram showing the arrangement of a passing/fetching means according to the second embodiment of the present invention;

DETAILED DESCRIPTION OF THE PREFERRED EMBODIMENTS (First Embodiment)

FIG. 4 is a diagram showing the first embodiment of the present invention. FIG. 4 illustrates a dynamic image network system constituted by a ring-shaped optical transmission path using three wavelengths, and six terminals (terminals I, II, . . . , VI).

Figure 1:
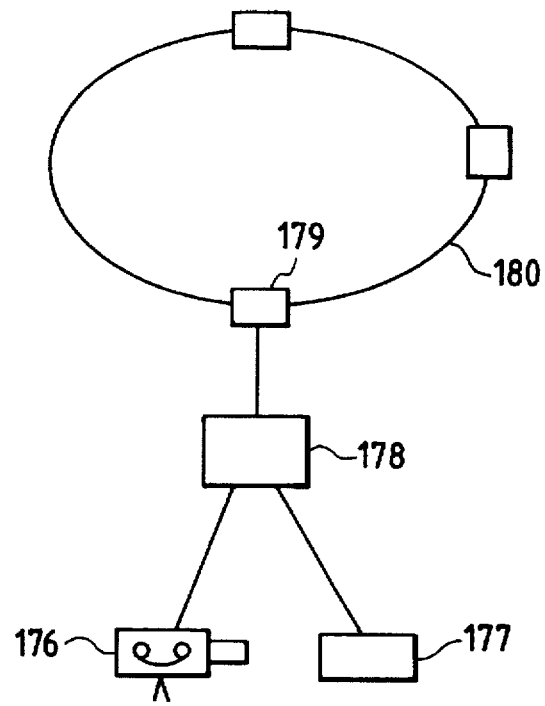
FIG. 1 is a diagram showing the arrangement of a conventional optical ring network.
Figure 5:
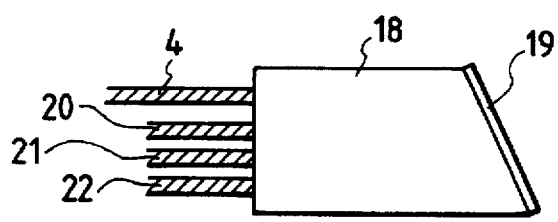
FIG. 5 is a view showing the arrangement of a wavelength demultiplexer of the first embodiment.

Referring to FIG. 4, since terminals I 1, II 2, and VI 3 have the same internal arrangement, the internal arrangement of only the terminal I is illustrated. Furthermore, illustration of terminals III, IV, and V is omitted for the sake of simplicity. Each terminal passes or fetches a specific wavelength $\lambda_r$ of three wavelengths ($\lambda_1=1.40$ μm, $\lambda_2=1.50$ μm, and $\lambda_3=1.60$ μm). The terminal receives the fetched optical signal, and passes optical signals other than the fetched wavelength $\lambda_r$ and supplies them to the next terminal. Also, the terminal transmits a signal to be transmitted at a wavelength $\lambda_s$. The wavelengths $\lambda_r$ and $\lambda_s$, are assigned to the respective terminals, as shown in Table 1 below. An optical fiber 4 serves as a triple-wavelength-multiplexing ring-shaped transmission path for connecting the terminals I, II, . . . , VI. A wavelength demultiplexer 5 demultiplexes one wavelength $\lambda_r$ shown in Table 1 from three wavelengths transmitted on the optical fiber 4 to an optical SW 7, and outputs the remaining two wavelengths to a wavelength multiplexer 6. FIG. 5 shows the internal arrangement of the wavelength demultiplexer 5.

TABLE 1

| Terminal Number | I | II | III | IV | V | VI |
|---|---|---|---|---|---|---|
| Reception Wavelength $\lambda_r$ | $\lambda_1$ | $\lambda_1$ | $\lambda_3$ | $\lambda_2$ | $\lambda_2$ | $\lambda_3$ |
| Transmission Wavelength $\lambda_s$ | $\lambda_3$ | $\lambda_2$ | $\lambda_2$ | $\lambda_1$ | $\lambda_3$ | $\lambda_1$ |
| Other than $\lambda_r$ and $\lambda_s$ | $\lambda_2$ | $\lambda_3$ | $\lambda_1$ | $\lambda_3$ | $\lambda_1$ | $\lambda_2$ |

The wavelength multiplexer 6 multiplexes an optical signal demultiplexed by the wavelength demultiplexer 5, an optical signal of the wavelength $\lambda_r$ output from the optical SW 7, and an optical signal of the wavelength $\lambda_s$ output from a transmitting unit 9, and outputs the multiplexed signal onto the optical fiber 4. The optical SW 7 switches an output destination of the optical signal of the wavelength $\lambda_r$ output from the wavelength demultiplexer 5 to the wavelength multiplexer 6 or a receiving unit 8 in accordance with an instruction from a control unit 10. The passing/fetching means is constituted by the wavelength demultiplexer 5, the wavelength multiplexer 6, and the optical SW 7. The wavelength demultiplexer 5 outputs a total amount of an optical signal of a wavelength assigned as the reception wavelength to the corresponding terminal toward the optical SW 7 side. However, a signal which need not be received is output to the wavelength multiplexer 6 without being fetched into the receiving unit side of the optical SW 7, by controlling the optical SW 7 in accordance with an instruction from a server 16, and passes through the corresponding terminal. Since an optical signal to be received is fetched into the receiving unit side of the optical SW 7, it is shielded there, and is never output to a downstream node. The receiving unit 8 receives light of the wavelength $\lambda_r$ output from the optical SW 7, and converts the light into an electrical signal. Thereafter, the receiving unit 8 serves to switch the output destination of the electrical signal to a decoding unit 11 or the transmitting unit 9 in accordance with an instruction from the control unit 10. Conversion from an optical signal into an electrical signal is attained using a PIN diode. The transmitting unit 9 converts an electrical signal output from the receiving unit 8 or a coding unit 12 into an optical signal of the predetermined wavelength $\lambda_s$, and outputs the optical signal. Conversion from an electrical signal into an optical signal is attained using a semiconductor laser diode. The control unit 10 controls the output destination of an optical output of the wavelength $\lambda_r$ from the optical SW 7, the output destination of an electrical signal output from the receiving unit 8, the ON/OFF operation of the transmitting unit 9, and the ON/OFF operations of the decoding unit 11 and the coding unit 12 in accordance with an instruction from the server, which instruction is output from a control communication unit 15. The ON/OFF operation of the decoding unit 11 is controlled in accordance with an instruction from the control unit 10. The decoding unit 11 decodes an electrical signal output from the receiving unit 8, and outputs the decoded signal to a display 13. The coding unit 12 codes a video signal output from a television (TV) camera 14, and outputs the coded signal to the transmitting unit 9. The ON/OFF operation of the coding unit 12 is controlled in accordance with an instruction from the control unit 10. The display 13 displays an electrical video signal output from the decoding unit 11. The TV camera 14 serves as a generation source of a video signal to be transmitted onto the network. The control communication unit 15 transmits a transmission request generated in the corresponding terminal to the server, and transfers an instruction received from the server to the control unit. The server 16 is connected to the terminals via a special-purpose control communication network. The server 16 decides a transmission permission/ inhibition mode on the basis of transmission requests of video signals transmitted from the respective terminals, and an operation management table of the terminals, which table is managed in the server, and sends instructions to the respective terminals. A user I/F unit 17 receives a transmission/reception instruction of a video signal from an operator of each terminal.

FIG. 5 is a detailed view of the wavelength demultiplexer 5 according to the first embodiment of the present invention. FIG. 5 illustrates a diffraction grating type wavelength demultiplexer. The wavelength demultiplexer 5 comprises a rod lens 18 with a diffraction grating 19, and output optical fibers 20, 21, and 22. When an optical signal of three wavelengths $\lambda_1$, $\lambda_2$, and $\lambda_3$ is input from the optical fiber 4 constituting the optical transmission path, the optical signal is reflected by the diffraction grating, and is split to different positions in units of wavelengths, so that an optical signal of the wavelength $\lambda_1$ is output to the optical fiber 20, an optical signal of the wavelength $\lambda_2$ is output to the optical fiber 21, and an optical signal of the wavelength $\lambda_3$ is output to the optical fiber 22. The connection destinations of these optical fibers are determined based on Table 1. That is, the optical fiber for transmitting an optical signal of the wavelength $\lambda_r$ is connected to the optical SW, and the remaining optical fibers are connected to the wavelength multiplexer.

Figure 6:
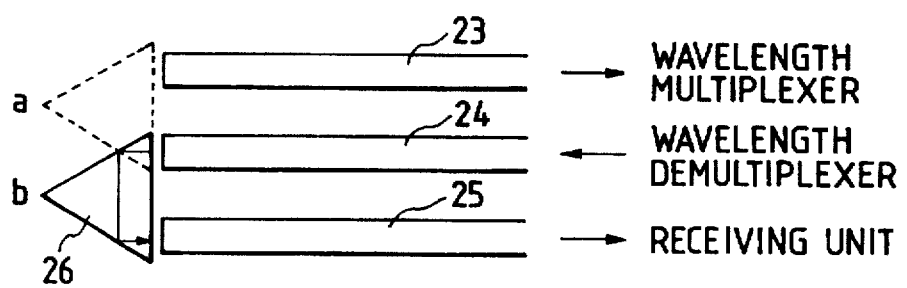
FIG. 6 is a view showing the arrangement of an optical SW of the first embodiment.
Figure 2:
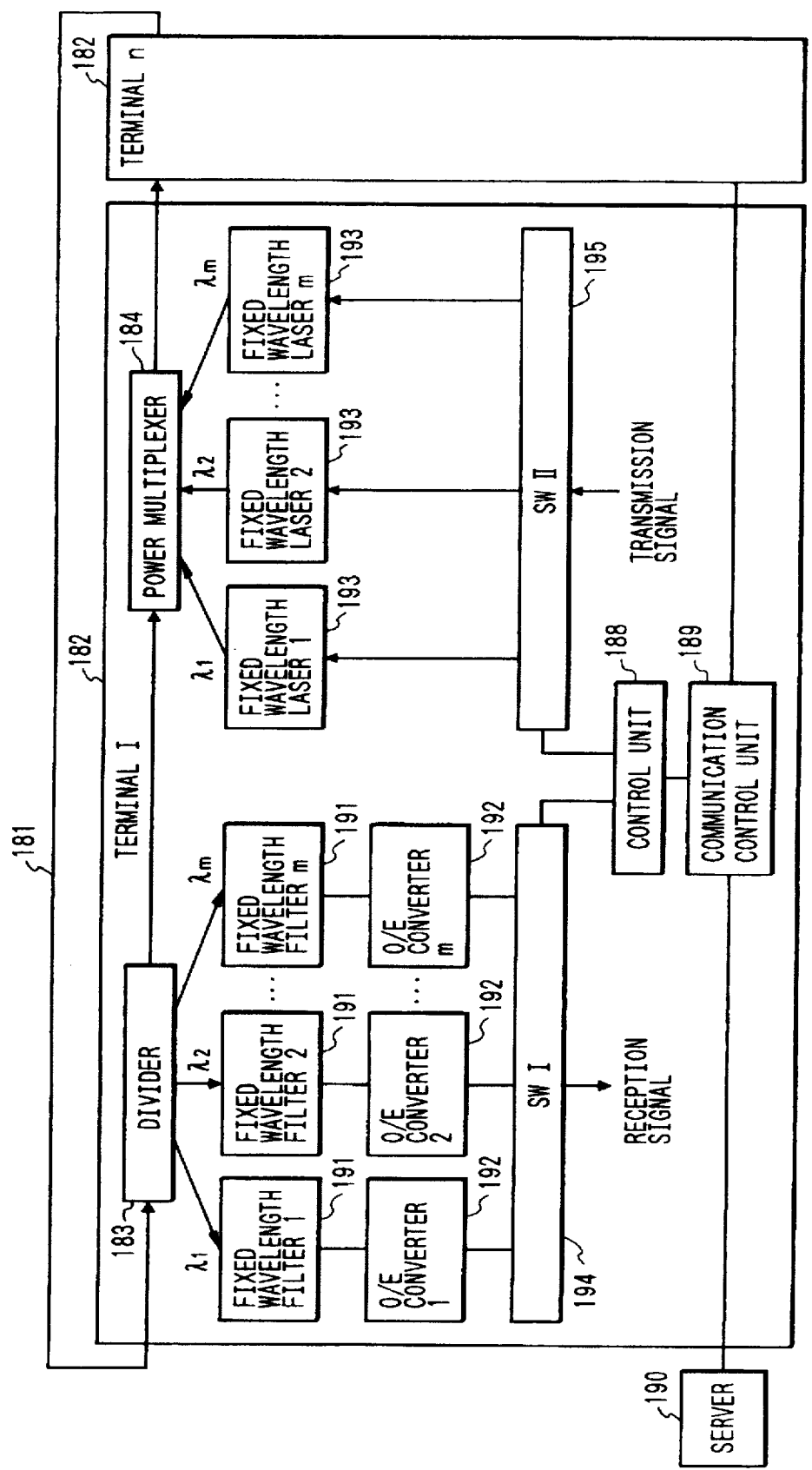
FIG. 2 is a diagram showing the arrangement of a network system according to the second prior art.
Figure 3:
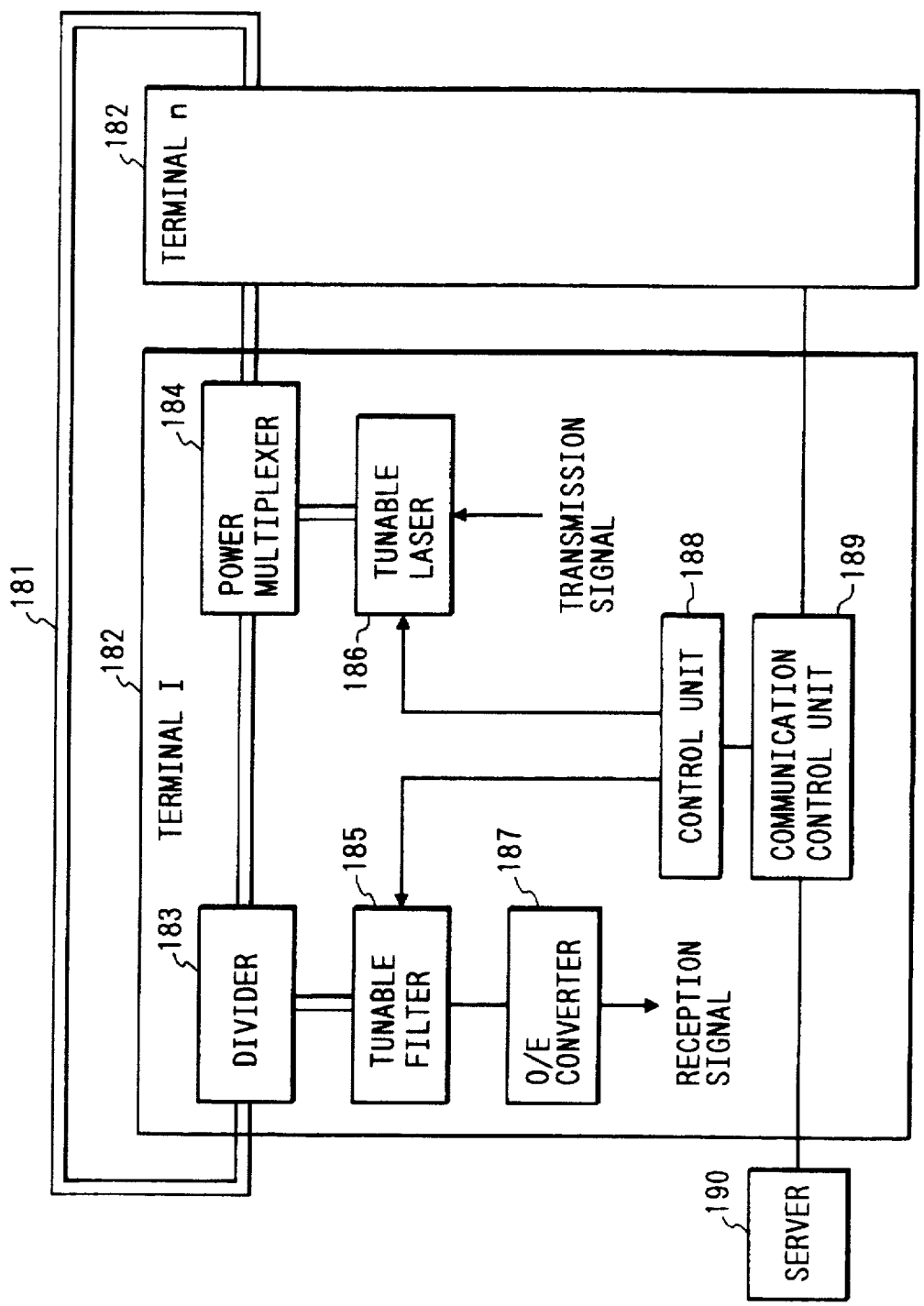
FIG. 3 is a diagram showing the arrangement of a network system according to the third prior art.

FIG. 6 shows an embodiment of the optical SW according to the first embodiment of the present invention. The optical SW comprises optical fibers 23, 24, and 25, and a prism 26 which is moved to a position b or a by a moving means (not shown). The optical fiber 24 propagates an optical signal from the wavelength demultiplexer 5. When the prism is located at the position b, the optical signal is reflected by the inner surfaces of the prism 26, and is received by the receiving unit 8 via the optical fiber 25. When the prism 26 is located at the position a, an optical signal propagating through the optical fiber 24 is reflected by the inner surfaces of the prism, and is output to the wavelength multiplexer 6 via the optical fiber 23.

The operation of the first embodiment of the present invention will be described below with reference to FIGS. 4, 5, and 6, and Table 1. In the following description, a case will be exemplified wherein transmission of a video signal from the terminal II to the terminal VI, transmission of a video signal from the terminal IV to the terminal I, and transmission of a video signal from the terminal I to the terminal III are simultaneously performed.

When an operator inputs a transmission request to the terminal VI using the user I/F unit 17 of the terminal II in a state wherein none of the terminals are performing transmission/reception of video signals, the user I/F unit 17 outputs the transmission request to the control communication unit 15. The control communication unit transmits the transmission request to the server 16 via the control communication transmission path. The server 16 detects a transmission path from the terminal II to the terminal VI with reference to the possible transmission/reception wavelengths of the respective terminals listed in Table 1, and transmits, using the control communication path, a transmission permission instruction to the terminal II, a transmission inhibition instruction to the terminal III, a passing instruction of $\lambda_r$ to the terminal IV, a reception instruction of $\lambda_r$ and a transmission instruction at $\lambda_s$ to the terminal V, and a reception permission instruction to the terminal VI. At the same time, the server 16 writes these instructions in the management table.

Upon reception of an instruction from the server, in the terminal II, the control unit 10 enables the operation of the coding unit 12, and sets the data input source of the transmitting unit 9 to be the coding unit 12.

With these setting operations, a video signal from the TV camera 14 is coded by the coding unit 12, and the coded signal is output to the transmitting unit 9. The transmitting unit 9 converts the video signal into an optical signal of a wavelength $\lambda_2$1.50 µm by the semiconductor laser diode, and outputs the converted signal onto the optical fiber 4 via the wavelength multiplexer 6. The optical signal of the wavelength $\lambda_2$=1.50 µm enters the wavelength multiplexer 6 of the terminal III, and is further output onto the optical fiber 4. Subsequently, since the terminal IV has received a passing instruction of an optical signal of a wavelength $\lambda_r$=$\lambda_2$1.50 µm from the server 16, as described above, the control unit 10 controls to set the prism 26 of the optical SW 7 at the position a. Therefore, the optical signal of the wavelength $\lambda_2$=1.50 µm input to the wavelength demultiplexer 5 of the terminal IV is input to the optical fiber 24 of the optical SW 7, is reflected by the prism 26, is input to the optical fiber 23, and is then output onto the optical fiber 4 again via the wavelength multiplexer 6.

Furthermore, since the terminal V has received a reception instruction of $\lambda_r$ and a transmission instruction at $\lambda_s$ from the server 16, as described above, the control unit 10 controls to set the prism 26 of the optical SW 7 at the position b, and also controls to supply the output from the receiving unit 8 to the transmitting unit 9. The optical signal of the wavelength $\lambda_2$=1.50 µm input to the wavelength demultiplexer 5 of the terminal V is input to the optical fiber 24 of the optical SW 7, is reflected by the prism 26, and is input to the receiving unit 8 via the optical fiber 25. Then, the optical signal is converted into an electrical signal by the PIN photodiode, and the electrical signal is output to the transmitting unit 9. In the transmitting unit 9, the electrical signal is converted into an optical signal of a wavelength $\lambda_3=1.60$ µm, and the optical signal is output onto the optical fiber 4 via the wavelength multiplexer 6.

On the other hand, since the terminal VI has received a reception permission instruction from the server 16, as described above, the control unit 10 controls to set the prism 26 of the optical SW 7 at the position b, to set the output destination of the receiving unit 8 to be the decoding unit 11, and to enable the operation of the decoding unit 11. The optical signal of the wavelength $\lambda_3 1.60$ µm input to the wavelength demultiplexer 5 of the terminal VI is input to the optical fiber 24 of the optical SW 7, is reflected by the prism 26, and is input to the receiving unit 8 via the optical fiber 25 to be converted into an electrical signal by the PIN photodiode of the receiving unit 8. In this manner, the video signal from the terminal II, which signal is converted into the electrical signal by the receiving unit 8, is decoded by the decoding unit 11 by a predetermined method, and is output onto the display 13.

When an operator of the terminal IV inputs a transmission request of a video signal to the terminal I during the transmission of the video signal from the terminal II to the terminal VI, as described above, the user I/F unit 17 of the terminal IV outputs this transmission request to the control communication unit 15. The control communication unit transmits this transmission request to the server 16 via the control communication transmission path. The server 16 detects a transmission path from the terminal IV to the terminal I on the basis of the possible transmission/reception wavelengths listed in Table 1 and the operating states of the respective terminals written in the management table, and transmits, using the control communication transmission path, a transmission permission instruction to the terminal IV, a transmission inhibition instruction to the terminal VI, and a reception permission instruction to the terminal I. At the same time, the server 16 additionally writes these instructions in the management table.

Upon reception of an instruction from the server, in the terminal IV, the control unit 10 enables the operation of the coding unit 12, and sets the data input source of the transmitting unit 9 to be the coding unit 12. With this setting, a video signal from the TV camera 14 is coded by the coding unit 12, and the coded signal is output to the transmitting unit 9. In the transmitting unit 9, the input signal is converted into an optical signal of a wavelength $\lambda_1=1.40$ µm by the semiconductor laser diode, and the converted signal is output onto the optical fiber 4 via the wavelength multiplexer 6. Subsequently, in the terminal V, as can be understood from Table 1, the optical signal of the wavelength $\lambda_1=1.40$ µm input to the wavelength demultiplexer 5 is directly output to the wavelength multiplexer 6, and is then output onto the optical fiber 4. On the other hand, since the terminal VI has received a transmission inhibition instruction from the server 16, as described above, the optical signal of the wavelength $\lambda_1=1.40$ µm input from the wavelength demultiplexer 5 is immediately output to the wavelength multiplexer, and is output onto the optical fiber 4. Subsequently, since the terminal I has received a reception permission instruction from the server 16, as described above, the control unit 10 controls to set the prism 26 of the optical SW 7 at the position b, to set the output destination of the receiving unit 8 to be the decoding unit 11, and to enable the operation of the decoding unit 11. The optical signal of the wavelength $\lambda_1=1.40$ µm input to the wavelength demultiplexer 5 of the terminal I is input to the optical fiber 24 of the optical SW 7, is reflected by the prism 26, and is input to the receiving unit 8 via the optical fiber 25 to be converted into an electrical signal by the PIN photodiode of the receiving unit 8. The video signal from the terminal IV, which is converted into the electrical signal by the receiving unit 8, as described above, is decoded by the decoding unit 11 by a predetermined method, and is output onto the display 13.

Furthermore, when an operator of the terminal I inputs a transmission request of a video signal to the terminal III during the transmission of the video signal from the terminal II to the terminal VI and the transmission of the video signal from the terminal IV to the terminal I, the user I/F unit 17 of the terminal I outputs this transmission request to the control communication unit 15. The control communication unit 15 transmits this transmission request to the server 16 via the control communication transmission path. The server 16 detects, using the possible transmission/reception wavelengths listed in Table 1 and the operating states of the terminals written in the management table, that transmission from the terminal I to the terminal III is possible, and transmits, using the control communication transmission path, a transmission permission instruction to the terminal I and a reception permission instruction to the terminal III. At the same time, the server 16 additionally writes these instructions in the management table.

Upon reception of an instruction from the server, in the terminal I, the control unit 10 enables the operation of the coding unit 12, and sets the data input source of the transmitting unit 9 to be the coding unit 12. With this setting, a video signal from the TV camera 14 is coded by the coding unit 12, and the coded signal is output to the transmitting unit 9. In the transmitting unit 9, the input signal is converted into an optical signal of a wavelength $\lambda_3=1.60$ µm by the semiconductor laser diode, and the converted signal is output onto the optical fiber 4 via the wavelength multiplexer 6. Subsequently, in the terminal II, as can be understood from Table 1, the optical signal of the wavelength $\lambda_3=1.60$ µm input to the wavelength demultiplexer 5 is directly output to the wavelength multiplexer 6, and is then output onto the optical fiber 4.

Subsequently, since the terminal III has received a reception permission instruction from the server 16, as described above, the control unit 10 controls to set the prism 26 of the optical SW 7 at the position b, to set the output destination of the receiving unit 8 to be the decoding unit 11, and to enable the operation of the decoding unit 11. The optical signal of the wavelength $\lambda_3 1.60$ µm input to the wavelength demultiplexer 5 is input to the optical fiber 24 of the optical SW 7, is reflected by the prism 26, and is input to the receiving unit 8 via the optical fiber 25 to be converted into an electrical signal by the PIN photodiode of the receiving unit 8. The video signal from the terminal I, which is converted into the electrical signal by the receiving unit 8, as described above, is decoded by the decoding unit 11 by a predetermined method, and is then output onto the display 13.

In this manner, when an operator of each terminal inputs a transmission request of a video signal, the server detects a transmission path in accordance with the transmission/reception wavelengths assigned to the respective terminals in Table 1 and the operating states of the respective terminals written in the management table, and supplies instructions to the corresponding terminals. When a transmission path is busy due to the operating states of the terminals, and it is impossible to perform transmission, the server transmits a transmission inhibition instruction to the terminal which issued a transmission request.

(Second Embodiment)

FIG. 7 is a diagram showing the second embodiment of the present invention, and illustrates the arrangement of a wave-passing/fetching means for passing or fetching a predetermined one of a plurality of wavelengths to be transmitted, in one terminal connected to a ring-shaped optical transmission path for multiplexing a plurality of wavelengths. The terminal with the arrangement shown in FIG. 7 can realize the network system of the present invention.

Referring to FIG. 7, an optical fiber type divider 27 divides an optical signal transmitted along an optical fiber 4 into four signals, and outputs these signals to a filter A 28, a filter B 29, a filter C 30, and a filter C 33. The filters 28 and 29 consist of a dielectric multi-layered film and have a function of passing only a specific wavelength therethrough. For example, when the arrangement shown in FIG. 7 is used in the terminal I in the first embodiment, the filter A 28 passes only light of a wavelength $\lambda_2=1.50$ μm therethrough, and the filter B 29 passes only light of a wavelength $\lambda_3=1.60$ μm therethrough. The filters 30 and 33 also consist of a dielectric multi-layered film, and pass only light corresponding to a wavelength $\lambda_r$ therethrough. A shutter 31 passes or shields an optical signal passing through the filter C 30. A power multiplexer 32 multiplexes optical signals passing through the filters A 28 and B 29, and the shutter 31, and an optical signal of a wavelength $\lambda_s$ output from a transmitting unit 9, and outputs the multiplexed signal onto the optical fiber 4. More specifically, in this embodiment, the passing/fetching means is constituted by the divider 27, the filters A 28, B 29, C 30, and C 33, the shutter 31, and the power multiplexer 32.

In the second embodiment, when a given terminal receives a reception instruction from the server, the control unit shields the shutter 31. On the other hand, when the terminal receives a passing instruction from the server, the control unit sets the shutter 31 to pass an optical signal therethrough. In this embodiment, since the shutter 31 has a short response time, the transmission path can be set quicker than the arrangement using the optical SW in the first embodiment.

In each of the first and second embodiments, all the terminals have different reception and transmission wavelengths. However, some terminals may use the same reception and transmission wavelengths. The assignment method of wavelengths is not limited to Table 1.

In each of the first and second embodiments, the control signal transmission path is separately arranged. However, when another wavelength is assigned to control signals, and means for demultiplexing and receiving the wavelength, and transmission means are arranged, the control signal may be sent while being multiplexed onto a main transmission path.

Although each of the first and second embodiments described above uses a server for controlling, e.g., arbitration of permission/inhibition of communications, each terminal equipment can have a simple arrangement. Furthermore, since each terminal equipment need not receive optical signals of all reception wavelengths, communications with high efficiency can be realized.

(Third Embodiment)

The third embodiment of the present invention will be described in detail below with reference to the accompanying drawings.

Figure 8:
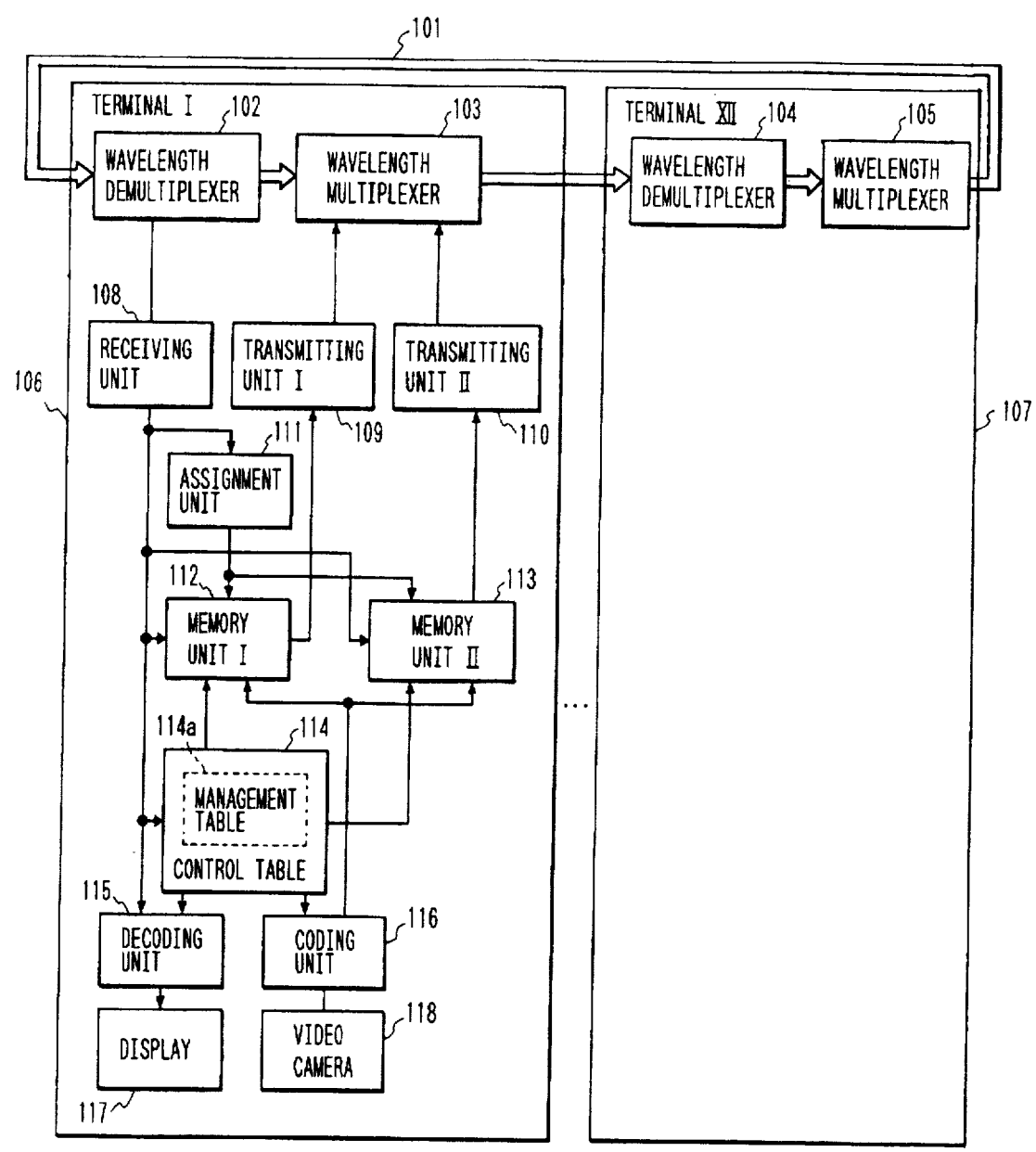
FIG. 8 is a diagram showing the arrangement of a network system according to the third embodiment of the present invention.

FIG. 8 is a block diagram showing the arrangement of a dynamic image network system of this embodiment. In this embodiment, 12 terminals (I to XII) are connected via a wavelength-multiplexing ring-shaped optical transmission path using four wavelengths $\lambda_1$, $\lambda_2$, $\lambda_3$, and $\lambda_4$.

Referring to FIG. 8, an optical fiber 101 constitutes the wavelength-multiplexing ring-shaped optical transmission path, and is connected to the terminals I to XII via wavelength demultiplexers 102 and 104, and wavelength multiplexers 103 and 105. As will be described later, each of the wavelength demultiplexers 102 and 104 extracts only an optical signal of a predetermined wavelength assigned to each terminal from optical signals of a plurality of wavelengths transmitted along the optical fiber 101, and demultiplexes the extracted signal to a receiving unit 108. Also, each of the wavelength demultiplexers 102 and 104 passes non-demultiplexed optical signals therethrough toward a corresponding one of the wavelength multiplexers 103 and 105. Each of the wavelength multiplexers 103 and 105 multiplexes an optical signal output from a transmitting unit 109 onto an optical signal transmitted along the optical fiber 101.

Since the terminals I to XII (106, 107) have the same internal arrangement, FIG. 8 illustrates the internal arrangement of only the terminal I 106. The receiving unit 108 receives an optical signal output from the wavelength demultiplexer 102, and converts the received signal into an electrical signal. Each of the transmitting unit I 109 and a transmitting unit II 110 transmits an optical signal at a wavelength assigned to each terminal, as will be described later. In this case, in each transmitting unit, an electrical signal from a corresponding memory unit is converted into an optical signal using a semiconductor laser diode (not shown).

An assignment unit 111 reads a receiving terminal number in a header added to the head of partial dynamic image data output from the receiving unit 108, and detects a wavelength to be used in transmission with reference to a routing table stored therein. Then, the assignment unit 111 selects a memory unit for storing the partial dynamic image data from a memory unit I 112 and a memory unit II 113.

Figure 9:
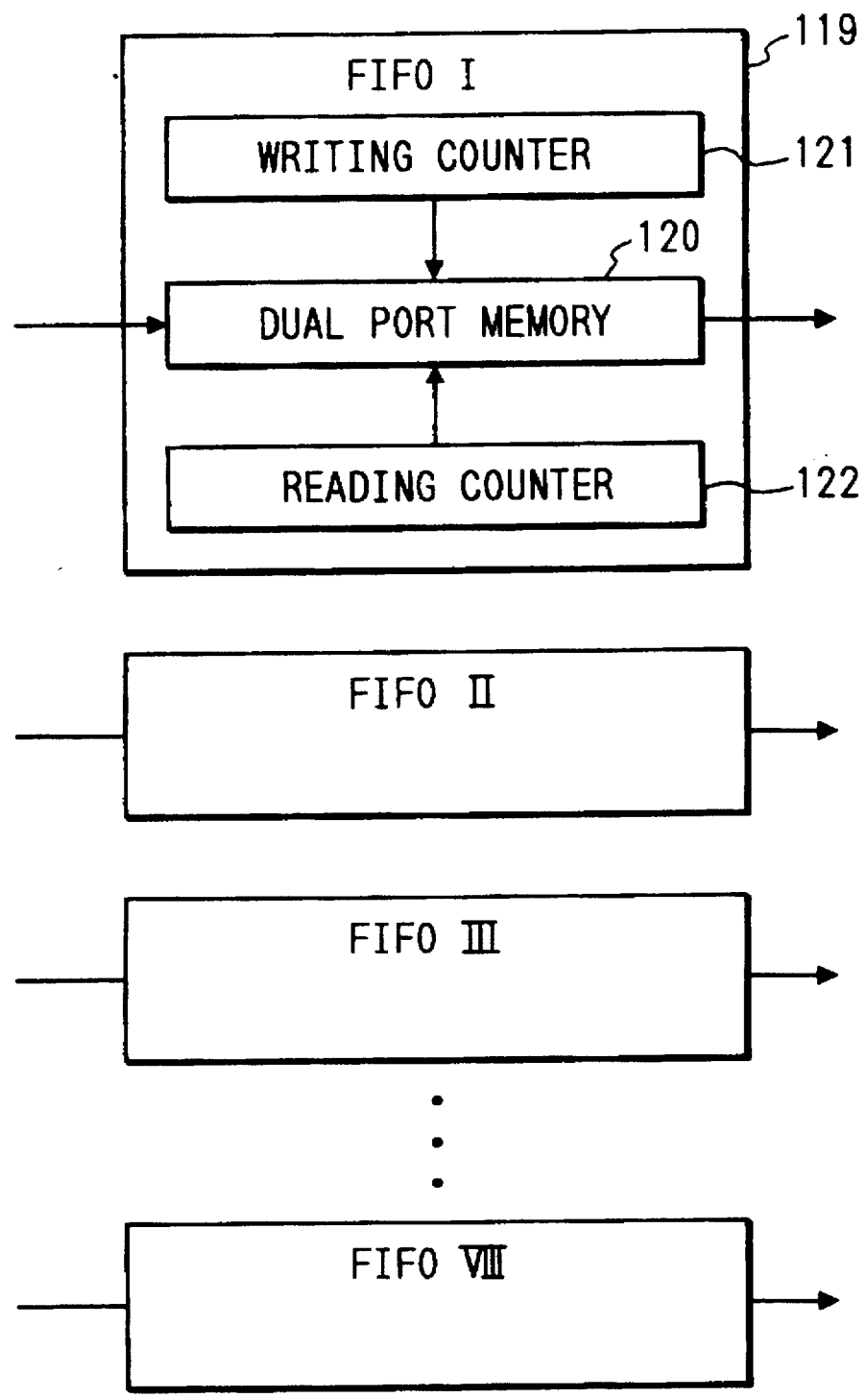
FIG. 9 is a diagram showing the arrangement of a storage means of the third embodiment.

Each of the memory units I 112 and II 113 comprises a plurality of FIFO (First-In-First-Out) memories so as to temporarily store data to be transferred of the partial dynamic image data received by the receiving unit 108 and data to be transmitted from the own terminal to another terminal in a priority order. FIG. 9 shows the internal arrangement of the memory unit.

A control unit 114 checks a receiving terminal number, priority order, coding type, allowable delay time, and the like in a header added to the head of partial dynamic image data input from the receiving unit 108. When the receiving terminal number coincides with the terminal number of the own terminal, the control unit 114 controls a decoding unit 115 to receive the partial dynamic image signal output from the receiving unit 108. The priority order, coding type, and allowable delay time will be described later.

When the receiving terminal number does not coincide with the terminal number of the own terminal, the control unit 114 controls to write the partial dynamic image data in a predetermined FIFO memory in the memory unit I 112 or II 113 in accordance with priority order information, and writes the priority order and allowable delay time of the partial dynamic image signal in a management table 114a.

The control unit 114 searches the management table 114a to read out signals with non-expired allowable delay times of partial dynamic image packet signals stored in the memory units I 112 and II 113 in accordance with the priority order, and outputs the readout signals to the transmitting units I 109 and II 110.

Figure 11:
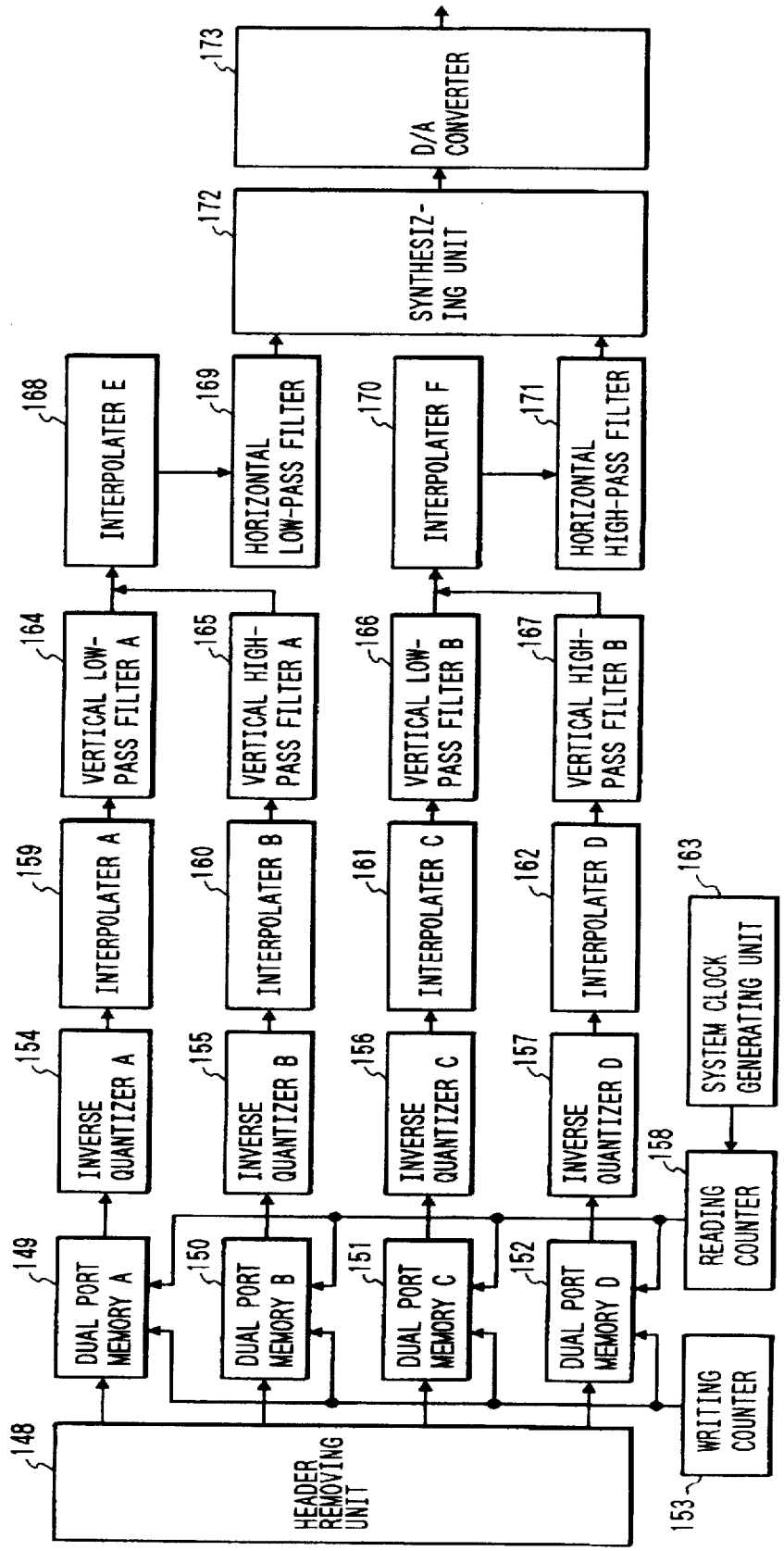
FIG. 11 is a block diagram showing a decoding unit of the third embodiment.

The decoding unit 115 has a function of decoding one or a plurality of partial dynamic image signals sent to the own terminal, and outputting the decoded signals as predetermined analog video signal. Note that FIG. 11 shows the internal arrangement of the decoding unit 115. A display 117 as a dynamic image output device visually displays an analog video signal output from the decoding unit 115.

Figure 10:
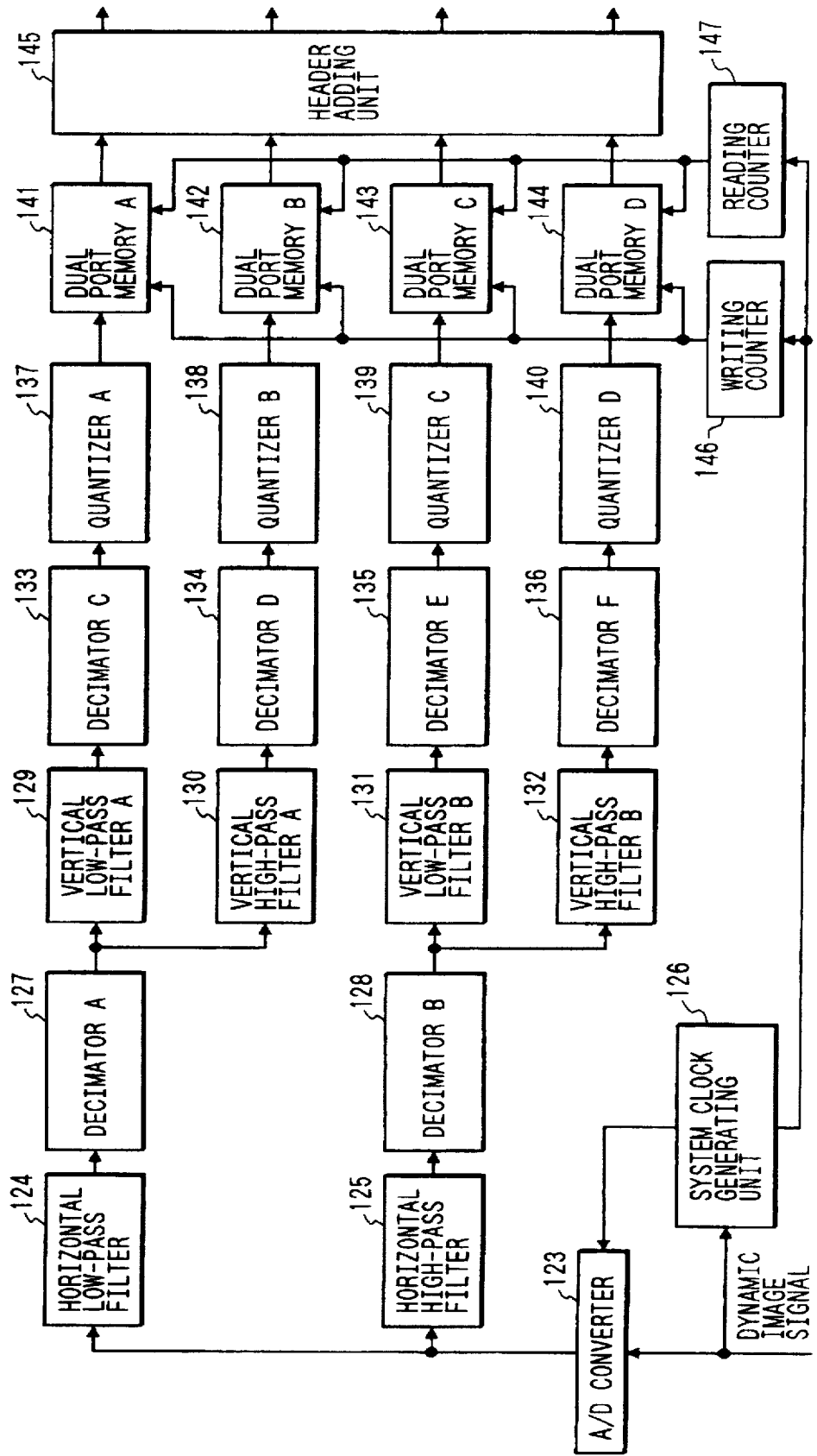
FIG. 10 is a block diagram showing a coding unit of the third embodiment.

A coding unit 116 converts an analog video signal output from a video camera 118 as a dynamic image information source into four partial dynamic image signals, adds predetermined headers to these signals to form signal packets, and thereafter, outputs the packet signals to the memory unit I 112 or II 113. Note that FIG. 10 shows the internal arrangement of the coding unit 116.

FIG. 9 is an internal block diagram of the memory unit 113 in each terminal constituting the dynamic image network system according to this embodiment. As shown in FIG. 9, the memory unit 113 comprises eight FIFO (First-In-First-Out) memories (I, II, III to VIII). Each FIFO memory comprises a dual port memory 120 capable of independently performing reading and writing operations, a writing counter 121 for generating a writing address, and a reading counter 122 for generating a reading address.

The wavelengths used in the dynamic image network system according to this embodiment are:

$$\lambda_1 = 1.50\ \mu m,\ \lambda_2 = 1.52\ \mu m,\ \lambda_3 = 1.54\ \mu m,$$

and $$\lambda_4 = 1.56\ \mu m$$

The wavelengths used upon reception and transmission of the respective terminals are as shown in Table 1 below:

TABLE 1

| Terminal | I | II | III | IV | V | VI | VII | VIII | IX | X | XI | XII |
|---|---|---|---|---|---|---|---|---|---|---|---|---|
| Reception Wavelength | $\lambda_1$ | $\lambda_1$ | $\lambda_1$ | $\lambda_2$ | $\lambda_2$ | $\lambda_2$ | $\lambda_3$ | $\lambda_3$ | $\lambda_3$ | $\lambda_4$ | $\lambda_4$ | $\lambda_4$ |
| Transmission Wavelength | $\lambda_1$ | $\lambda_1$ | $\lambda_1$ | $\lambda_2$ | $\lambda_2$ | $\lambda_2$ | $\lambda_3$ | $\lambda_3$ | $\lambda_3$ | $\lambda_4$ | $\lambda_4$ | $\lambda_4$ |
| Transmission Wavelength | $\lambda_2$ | $\lambda_3$ | $\lambda_4$ | $\lambda_1$ | $\lambda_3$ | $\lambda_4$ | $\lambda_1$ | $\lambda_2$ | $\lambda_4$ | $\lambda_1$ | $\lambda_2$ | $\lambda_3$ |

The assignment unit 111 stores a routing table for selecting transmission wavelengths shown in Table 2 below on the basis of the transmission/reception wavelengths assigned to the respective terminals and listed in Table 1. Thus, the assignment unit 111 selects a transmission wavelength in accordance with a transmission destination terminal of the received partial dynamic image signal, and determines a memory unit which is to store the partial dynamic image signal.

TABLE 2

Routing Table

| Terminal \ Transmission Destination Terminal | I | II | III | IV | V | VI | VII | VIII | IX | X | XI | XII |
|---|---|---|---|---|---|---|---|---|---|---|---|---|
| I | — | $\lambda_1$ | $\lambda_2$ | $\lambda_2$ | $\lambda_2$ | $\lambda_2$ | $\lambda_1$ | $\lambda_1$ | $\lambda_1$ | $\lambda_1$ | $\lambda_1$ | $\lambda_1$ |
| II | $\lambda_1$ | — | $\lambda_1$ | $\lambda_1$ | $\lambda_1$ | $\lambda_1$ | $\lambda_1$ | $\lambda_1$ | $\lambda_1$ | $\lambda_4$ | $\lambda_4$ | $\lambda_4$ |
| III | $\lambda_1$ | $\lambda_1$ | — | $\lambda_2$ | $\lambda_2$ | $\lambda_2$ | $\lambda_2$ | $\lambda_2$ | $\lambda_2$ | $\lambda_2$ | $\lambda_2$ | $\lambda_2$ |
| IV | $\lambda_1$ | $\lambda_1$ | $\lambda_1$ | — | $\lambda_2$ | $\lambda_3$ | $\lambda_3$ | $\lambda_3$ | $\lambda_2$ | $\lambda_2$ | $\lambda_2$ | $\lambda_2$ |
| V | $\lambda_2$ | $\lambda_2$ | $\lambda_2$ | $\lambda_2$ | — | $\lambda_2$ | $\lambda_2$ | $\lambda_2$ | $\lambda_2$ | $\lambda_4$ | $\lambda_4$ | $\lambda_4$ |
| VI | $\lambda_2$ | $\lambda_2$ | $\lambda_2$ | $\lambda_2$ | $\lambda_2$ | — | $\lambda_3$ | $\lambda_3$ | $\lambda_3$ | $\lambda_3$ | $\lambda_3$ | $\lambda_3$ |
| VII | $\lambda_1$ | $\lambda_1$ | $\lambda_1$ | $\lambda_3$ | $\lambda_3$ | $\lambda_3$ | — | $\lambda_3$ | $\lambda_3$ | $\lambda_3$ | $\lambda_3$ | $\lambda_3$ |
| VIII | $\lambda_3$ | $\lambda_3$ | $\lambda_3$ | $\lambda_2$ | $\lambda_2$ | $\lambda_2$ | $\lambda_3$ | — | $\lambda_3$ | $\lambda_4$ | $\lambda_4$ | $\lambda_4$ |
| IX | $\lambda_3$ | $\lambda_3$ | $\lambda_3$ | $\lambda_3$ | $\lambda_3$ | $\lambda_3$ | $\lambda_3$ | $\lambda_3$ | — | $\lambda_4$ | $\lambda_4$ | $\lambda_4$ |
| X | $\lambda_1$ | $\lambda_1$ | $\lambda_1$ | $\lambda_4$ | $\lambda_4$ | $\lambda_4$ | $\lambda_4$ | $\lambda_4$ | $\lambda_4$ | — | $\lambda_4$ | $\lambda_4$ |
| XI | $\lambda_4$ | $\lambda_4$ | $\lambda_4$ | $\lambda_2$ | $\lambda_2$ | $\lambda_2$ | $\lambda_4$ | $\lambda_4$ | $\lambda_4$ | $\lambda_4$ | — | |
| XII | $\lambda_4$ | $\lambda_4$ | $\lambda_4$ | $\lambda_4$ | $\lambda_4$ | $\lambda_4$ | $\lambda_3$ | $\lambda_3$ | $\lambda_3$ | $\lambda_4$ | $\lambda_4$ | — |

In this embodiment, in the respect terminals, one of wavelengths allowed to be transmitted is adapted to be coincident with a wavelength allowed to be received. In this embodiment, the routine table (Table 2) is designed such that in communication between one terminal (referred to as own terminal) and another terminal (referred to as a transmission destination terminal), only in the case that a wavelength $\lambda_n$ allowed to be received by the transmission destination terminal is coincident with a wavelength which is same as one of wavelengths allowed to be transmitted by the own terminal but which is not coincident with a wavelength allowed to be received by the own terminal, the wavelength $\lambda_n$ is used for transmission from the own terminal to the transmission destination terminal. In a case other than the case mentioned above, the transmission from the own terminal to the transmission destination terminal is performed using a wavelength which is same as a wavelength received by the own terminal. As can be seen from Table 1, since the terminal I performs reception of $\lambda_1$ and transmission of $\lambda_1$ and $\lambda_2$, it performs transmission at $\lambda_2$ to only the terminals IV, V, and VI which have a reception function of $\lambda_2$, and performs transmission at $\lambda_1$ to other terminals. When this routing table is used, a partial dynamic image signal to be transmitted from, e.g., the terminal I to the terminal VII is transmitted from the terminal I at the wavelength $\lambda_1$, and is received by the terminal II. Thereafter, the partial dynamic image signal is transmitted from the terminal II at the wavelength $\lambda_3$, and is received by the terminal VII.

Note that this routing path is not uniquely determined. For example, in the above-mentioned transmission from the terminal I to the terminal VII, when a large number of partial dynamic image signals are queued in the memory portion corresponding to the wavelength $\lambda_1$ in the terminal I, transmission is performed at the wavelength $\lambda_2$. In this case, the following routing path is used. That is, a partial dynamic image signal from the terminal I is received by the terminal IV, and is transmitted therefrom at the wavelength $\lambda_2$ again. The partial dynamic image signal is received by the terminal V, and is transmitted therefrom at the wavelength $\lambda_3$. Then, the partial dynamic image signal is received by the terminal VII. More specifically, since each terminal has a plurality of transmission wavelengths, the degree of freedom upon setting of a routing path can be increased. Since no tunable light source such as a tunable laser is used, each terminal can have a simple arrangement, and no means for switching transmission wavelengths is required.

A method of efficiently transmitting, especially, a dynamic image signal in the above-mentioned arrangement will be described in detail below. In this method, a dynamic image signal is divided into four partial dynamic image signals, and the four partial dynamic image signals are transmitted while properly assigning a priority order and allowable delay times to these signals.

FIG. 10 is a detailed block diagram of the coding unit 116 in each terminal constituting the system of this embodiment. The coding unit 116 adopts a so-called sub-band coding system constituted by filters.

Referring to FIG. 10, an A/D converter 123 converts a dynamic image signal output from the video camera 118 into a digital signal. A horizontal low-pass filter 124 passes only horizontal low-frequency components of a video image therethrough. A horizontal high-pass filter 125 passes only horizontal high-frequency components of a video image therethrough.

A system clock generating unit 126 extracts a synchronization signal from a dynamic image signal output from the video camera 118, and generates a sampling signal and various timing signals used in the terminal. Decimators A 127 and B 128 decimate pixels to ½ in the horizontal direction.

Vertical low-pass filters A 129 and B 131 pass only vertical low-frequency components of a video image therethrough, and vertical high-pass filters 130 and 132 pass only vertical high-frequency components of a video image therethrough.

Decimators C 133, D 134, E 135, and F 136 decimate pixels to ½ in the vertical direction. quantizers 137 to 140 compress the outputs from the decimators C, D, E, and F to a predetermined bit length. The coding unit 116 also comprises dual port memories A 141, B 142, C 143, and D 144, a header adding unit 145, a writing counter 146, and a reading counter 147.

The outputs from the quantizers A, B, C, and D are written in the dual port memories A, B, C, and D (141, 142, 143, and 144) in accordance with an address value output from the writing counter 146, and data are read out from these memories in accordance with an address value output from the reading counter 147. The writing counter 146 and the reading counter 147 perform count operations in accordance with system clocks output from the system clock generating unit 126.

The header adding unit 145 adds a header including a destination terminal address, source terminal address, priority order, allowable delay time, and the like to each of partial dynamic image data read out from the dual port memories A, B, C, and D.

FIG. 11 is a detailed block diagram of the decoding unit 115 in each terminal constituting the system according to the embodiment of the present invention.

Referring to FIG. 11, a header removing unit 148 removes header information added to a partial dynamic image signal. Dual port memories A 149, B 150, C 151, and D 152 are used for synchronously reproducing a plurality of partial dynamic image signals from which headers are removed by the header removing unit 148.

A writing counter 153 generates an address for writing partial dynamic image signals, from which the headers are removed, in the dual port memories A, B, C, and D. A reading counter 158 generates an address for reading out the partial dynamic image signals written in the dual port memories A, B, C, and D on the basis of a timing signal output from a system clock generating unit 163.

Inverse quantizers A 154, B 155, C 156, and D 157 expand a bit length compressed by the quantizers A, B, C, and D in the above-mentioned coding unit to a predetermined length. Interpolaters A 159, B 160, C 161, and D 162 interpolate pixels to ×2 in the vertical direction.

Vertical low-pass filters A 164 and B 166 pass only vertical low-frequency components of partial dynamic image signals therethrough. Vertical high-pass filters A 165 and B 167 pass only vertical high-frequency components of partial dynamic image signals therethrough.

Interpolators E 168 and F 170 interpolate pixels to ×2 in the horizontal direction. A horizontal low-pass filter 169 passes only horizontal low-frequency components of a partial dynamic image signal therethrough. A horizontal low-pass filter 171 passes only horizontal high-frequency components of a partial dynamic image signal therethrough. Note that the decoding unit 115 also includes a synthesizing unit 172 and a D/A converter 173.

In this embodiment, the operations performed by each terminal are roughly classified into the following three operations, and each terminal performs necessary ones of the three operations:

① Coding: an operation for dividing a dynamic image signal to be transmitted into partial dynamic image signals, and coding the partial dynamic image signals;

② Relaying: an operation for transmitting partial dynamic image data codes received from the transmission path and partial dynamic image signals generated by the own terminal onto the transmission path in a predetermined procedure at a predetermined wavelength; and ③ Decoding: an operation for decoding partial dynamic image signals sent to the own terminal.

The above-mentioned three operations will be described in detail below.

<Coding Operation>

When a dynamic image signal is input from the video camera 118, a sampling signal having a period equal to a pixel period T is generated. The A/D converter 123 A/D-converts the dynamic image signal in response to sampling clocks output from the system clock generating unit 126, and outputs the converted signal to the horizontal low-pass filter 124 and the horizontal high-pass filter 125. The horizontal low-pass filter 124 removes horizontal high-frequency components from the input digital signal, and thereafter, pixels are decimated to ½ in the horizontal direction by the decimator A 127.

On the other hand, the horizontal high-pass filter 125 removes horizontal low-frequency components, and pixels are then decimated to ½ in the horizontal direction by the decimator B 128. The output from the decimator A 127 is input to the vertical low-pass filter A 129, and vertical high-frequency components are removed from the input signal. The output from the filter A 129 is input to the decimator C 133, so that pixels are decimated to ½ in the vertical direction by the decimator C 133. Thereafter, the decimated signal is compressed to a predetermined bit length by the quantizer A 137. In this manner, the quantizer A 137 outputs a partial dynamic image signal A which contains only low-frequency components in both the horizontal and vertical directions.

The output from the decimator A 127 is also output to the vertical high-pass filter A 130, and vertical low-frequency components are removed from the input signal. The output from the filter A 130 is input to the decimator D 134, so that pixels are decimated to ½ in the vertical direction. Thereafter, the output from the decimator D 134 is compressed to a predetermined bit length by the quantizer B 138. In this manner, the quantizer B 138 outputs a partial dynamic image signal B which contains only low-frequency components in the horizontal direction and only high-frequency components in the vertical direction.

On the other hand, the dynamic image signal output from the decimator B 128 and containing only high-frequency components in the horizontal direction is input to the vertical low-pass filter B 131, and vertical high-frequency components are removed from the input signal. The output from the filter B 131 is input to the decimator E 135, so that pixels are decimated to ½ in the vertical direction. Thereafter, the output from the decimator E 135 is compressed to a predetermined bit length by the quantizer C 139. Then, a partial dynamic image signal C which contains only high-frequency components in the horizontal direction and only low-frequency components in the vertical direction is output to the dual port memory C 143.

The output from the decimator B 128 is also output to the vertical high-pass filter B 132, and vertical low-frequency components are removed from the input signal. Thereafter, the output from the filter B 132 is input to the decimator F 136, so that pixels are decimated to ½ in the vertical direction. Thereafter, the output from the decimator F 136 is compressed to a predetermined bit length by the quantizer D 140, and the compressed signal is output to the dual port memory D 144 as a partial dynamic image signal D which contains only high-frequency components in both the horizontal and vertical directions.

The partial dynamic image signals A, B, C, and D input to the dual port memories A, B, C, and D (141, 142, 143, and 144) are written at predetermined positions in accordance with an address generated by the writing counter 146. The reading counter 147 generates a reading address at a predetermined timing for transmission, and outputs the generated address to the dual port memories A, B, C, and D. The partial dynamic image signals are sequentially read out from the dual port memories A, B, C, and D as serial signals, and the serial signals are output to the header adding unit 145.

The header adding unit 145 adds, to the output from the dual port memory A 141, header information including a receiving terminal address and the own terminal address as a transmission source address, a coding type=A, a priority level=1, a coding time=transmission time, and an allowable delay time=4 msec, and writes the signal in the FIFO V in the memory unit I 112 or II 113 in accordance with designation from the assignment unit 111.

Similarly, the header adding unit 145 adds, to the output from the dual port memory B 142, substantially the same header information as that added to the output from the memory A 141, except that a coding type=B and a priority level=2, and writes the signal in the FIFO VI in the memory unit I 112 or II 113 in accordance with designation from the assignment unit 111.

Furthermore, the header adding unit 145 adds, to the output from the dual port memory C 143, substantially the same header information as that added to the output from the memory A 141, except that a coding type=C and a priority level=3, and writes the signal in the FIFO VII in the memory unit I 112 or II 113 in accordance with designation from the assignment unit 111. Also, the header adding unit 145 adds, to the output from the dual port memory D 144, substantially the same header information as that added to the output from the memory A 141, except that a coding type=D and a priority level=4, and writes the signal in the FIFO VIII in the memory unit I 112 or II 113 in accordance with designation from the assignment unit 111.

When the header adding unit writes data in the memory unit, the assignment unit 111 searches a transmission wavelength corresponding to the receiving terminal address from the routing table, and then instructs to select the memory unit I 112 or II 113 in which data are to be written.

In this manner, the data written in the FIFOs V to VIII in the memory unit I 112 or II 113 are appropriately processed in relay processing to be described below.

<Relay Processing>

Partial dynamic image signal data transmitted from another terminal (e.g., the terminal X) is transmitted along the optical transmission path 101 using the wavelength $\lambda_1$, and is received by the receiving unit 118 in the terminal I. After information in the header portion of the received data is checked by the control unit 114, the output destination of the received data is controlled. When the receiving terminal address stored in the header portion coincides with the terminal address of the own terminal (the terminal I in this case), the output from the receiving unit 108 is supplied to the decoding unit 115.

On the other hand, when the receiving terminal address does not coincide with the own terminal address, the assignment unit 111 searches a transmission wavelength corresponding to the receiving terminal address from the routing table, and instructs to select the memory unit I 112 or II 113 in which the received data is to be written. Subsequently, priority order information is checked. When a priority level=1, the received data is output to the dual port memory of the FIFO I in the memory unit I 112 or II 113 in accordance with the instruction from the assignment unit 111.

Similarly, when a priority level=2, the received data is supplied to the dual port memory in the FIFO II. Also, when a priority level=3 or 4, the received data is supplied to the dual port memory of the FIFO III or IV.

The partial dynamic image signals output to the memory unit I 112 or II 113 are sequentially written at predetermined addresses in accordance with the writing addresses output from the writing counter 121. At this time, the control unit 114 registers the writing start address, the writing end address, and the transmission time and the allowable delay time which are added in the header portion in the management table.

In this manner, the partial dynamic image signals received at the receiving unit 108 are written in the memory units I 112 and II 113, and the partial dynamic image signals to be transmitted from the own terminal are written in the FIFOs V to VIII, as has been described with reference to the coding operation above.

In this manner, the partial dynamic image data written in the memory units I 112 and II 113 are independently read out as follows under the control of the control unit, and are respectively output to the transmitting units I and II (109 and 110). The control unit 114 then checks the presence/absence of non-transmitted partial dynamic image data signals in the FIFOs by comparing the values of the reading counters of the FIFOs with the value of the writing counter.

When non-transmitted partial dynamic image data remains in the FIFO I, the control unit 114 checks the transmission time and the allowable delay time from the management table, and adds the allowable delay time to the transmission time. When the sum is larger than the current time, the control unit 114 determines the corresponding data to be valid data, and controls the reading counter 122 to output a reading address, thereby sequentially reading out data from the dual port memory 120. The control unit 114 then outputs the readout data to the transmitting unit I 109. The transmitting unit 109 converts the input signal into an optical signal of a predetermined wavelength, and transmits the optical signal onto the optical fiber 101 as the optical transmission path.

When the sum of the transmission time and the allowable delay time is smaller than the current time, the control unit 114 determines the corresponding data to be invalid data, and sets the value of the reading counter 122 to be the writing start address of the following partial dynamic image signal, thereby abandoning the invalid partial dynamic image signal.

In this manner, when the FIFO I which stores partial dynamic image signals with the highest priority level outputs all non-transmitted partial dynamic image data signals, the control unit 114 performs transmission of non-transmitted partial dynamic image data signals in the FIFO II by the same method as described above.

When a new partial dynamic image signal is written in the FIFO I during transmission of data in the FIFO II, the partial dynamic image data signal in the FIFO I is transmitted after the end of transmission of the partial dynamic image signal which is being currently transmitted.

In this embodiment, as described above, a partial dynamic image signal with a low priority level is transmitted while preferentially transmitting a partial dynamic image signal with a high priority level. The control unit 114 sequentially reads out partial dynamic image signals in the memory unit II 113, and sends them to the transmitting unit II 110. The control operations of the memory units I and II are parallelly performed by the control unit 114 at the same time.

In transfer, the received partial dynamic image data is transmitted from the transmitting unit I 109 or II 110 as an optical signal of a predetermined wavelength in accordance with the routing table.

Figure 12:
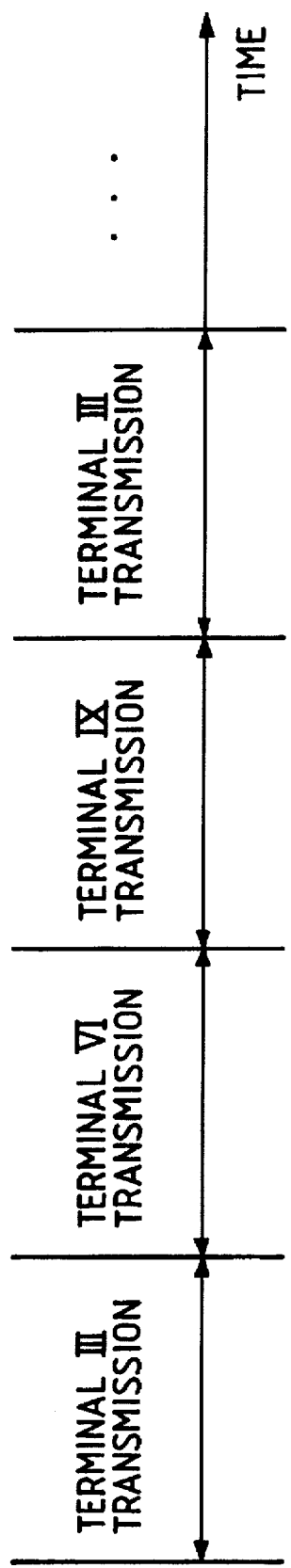
FIG. 12 is a timing chart of time-divisional multiplexing in the third embodiment.

Upon execution of transmission using a wavelength different from the reception wavelength in this embodiment, access contention of transmission among a plurality of terminals occurs. For example, the terminals III, VI, and IX have a function of performing transmission at the wavelength $\lambda_4$. Since optical signals output from these three terminals at the wavelength are received by the terminal X, an interference occurs, and data cannot be accurately transmitted. For this reason, each terminal performs time-divisional multiplexing transmission, as shown in FIG. 12, thereby avoiding access contention.

On the other hand, upon execution of transmission using a wavelength equal to the reception wavelength, since an optical signal transmitted from a terminal located at the upstream side in the transmission direction is shielded, i.e., is demultiplexed and fetched in a total amount by the wavelength demultiplexer 102, it never interferes with an optical signal to be transmitted from the own terminal. More specifically, since an optical signal of the wavelength $\lambda_1$ transmitted from the terminal I is shielded by the wavelength demultiplexer 102 of the terminal II, it does not reach the terminal III beyond the terminal II, and does not interfere with an optical signal of the wavelength $\lambda_1$ transmitted from the terminal II.

<Decoding Processing>

A partial dynamic image data signal input to the decoding unit 115 shown in FIG. 8 is input to the header removing unit 148 shown in FIG. 11, and the header portion is removed from the signal. When the coding type recorded in the header portion is A, the input signal is output to the dual port memory A 149. When the coding type is B, C, or D, the signal is output to a corresponding one of the dual port memories B, C, and D. Then, the signal is written in the dual port memory in accordance with a writing address output from the writing counter 153.

A partial dynamic image data signal transmitted from a transmitting terminal is transmitted to a receiving terminal while being relayed by intermediate terminals. When the transmission load on a certain intermediate terminal is large, and transmission of the signal is waited beyond its allowable delay time, the partial dynamic image signal is abandoned, as described above. For this reason, all the four partial dynamic image data signals transmitted from the transmitting terminal do not always reach the receiving terminal. The operation of the decoding unit 115 changes depending on the number of reached partial dynamic image signals.

i) When the number of reached partial dynamic image signals is 4:

The control unit 114 counts the number of partial dynamic image data signals which reach the decoding unit 115 in units of frame periods of an image to be output to the display 117. When the number of signals is 4, the control unit 114 controls to allow reading of data stored in the dual port memories A, B, C, and D.

A reading address signal is output from the reading counter 158 in accordance with a system clock generated by the system clock generating unit 163, and data are read out from the dual port memories A, B, C, and D.

The output from the dual port memory A 149 is the partial dynamic image signal A which contains only low-frequency components in both the horizontal and vertical directions, and is expanded to a predetermined bit length by the inverse quantizer A 154. Thereafter, the expanded signal is input to the interpolater A 159, and pixels are interpolated to ×2 in the vertical direction. The interpolated signal is input to the vertical low-pass filter A 164, and high-frequency noise components generated by the interpolation are removed from the input signal. Then, the output from the filter A 164 is supplied to the interpolater E 168.

The output from the dual port memory B 150 is the partial dynamic image signal B which contains low-frequency components in the horizontal direction and high-frequency components in the vertical direction, and is expanded to a predetermined bit length by the inverse quantizer B 155. Thereafter, the expanded signal is input to the interpolater B 160, and pixels are interpolated to ×2 in the vertical direction. The interpolated signal is then input to the vertical high-pass filter A 165, and low-frequency noise components generated by interpolation are removed from the input signal. Then, the output from the filter A 165 is output to the interpolater E 168.

In the interpolater E 168, pixels are interpolated to ×2 in the horizontal direction. The interpolated signal is then input to the horizontal low-pass filter 169, and horizontal low-frequency noise components generated by the interpolation are removed from the input signal. Thereafter, the signal is output to the synthesizing unit 172.

The output from the dual port memory C 151 is the partial dynamic image signal C which contains high-frequency components in the horizontal direction and low-frequency components in the vertical direction, and is expanded to a predetermined bit length by the inverse quantizer C 156. Thereafter, the expanded signal is input to the interpolater C 161, and pixels are interpolated to ×2 in the vertical direction. The interpolated signal is input to the vertical low-pass filter B 166, and vertical high-frequency noise components are removed from the input signal. The output from the filter B 166 is then output to the interpolater F 170.

The output from the dual port memory D 152 is the partial dynamic image signal D which contains only high-frequency components in both the horizontal and vertical directions, and is expanded to ×2 in the vertical direction by the interpolater D 162. Thereafter, the interpolated signal is input to the vertical high-pass filter B 167, and vertical low-frequency noise components generated by the interpolation are removed from the input signal. Then, the output from the filter B 167 is output to the interpolater F 170.

In the interpolater F 170, pixels are interpolated to ×2 in the horizontal direction. Thereafter, the interpolated signal is input to the horizontal high-pass filter 171, and horizontal low-frequency noise components are removed from the input signal. Then, the output from the filter 171 is output to the synthesizing unit 172. The synthesizing unit 172 synthesizes the signal which is output from the horizontal low-pass filter 169 and from which horizontal high-frequency components are omitted, and the signal which is output from the horizontal high-pass filter 171 and from which horizontal low-frequency components are omitted, so as to reproduce an original dynamic image signal. Then, the unit 172 outputs the reproduced signal to the D/A converter 173. The D/A converter 173 converts the dynamic image signal into a predetermined analog video signal, and outputs the analog video signal to the display 117.

ii) When the number of reached partial dynamic image signals is 3 (A, B, C):

The control unit 114 inhibits the reading operation of the dual port memory D 152, and outputs dummy data of "0" components (signal value="0"). Then, the control unit 114 controls other units in the same manner as in the above-mentioned case wherein the number of reached partial dynamic image data is 4. As a result, the D/A converter 173 outputs a dynamic image signal from which vertical high-frequency components are omitted.

iii) When the number of reached partial dynamic image signals is 2 (A, B):

The control unit 114 inhibits the reading operations of the dual port memories C and D (151 and 152), and outputs dummy data of "0" components. In this case, the D/A converter 173 outputs a dynamic image signal from which high-frequency components are omitted in both the vertical and horizontal directions.

iv) When the number of reached partial dynamic image signals is 1:

The control unit 114 inhibits the reading operations of the dual port memories B, C, and D, and outputs dummy data of "0" components. Thus, the D/A converter 173 outputs a dynamic image signal which contains only low-frequency components in the vertical direction.

When none of partial dynamic image data reach the decoding unit 115, since previously reached partial dynamic image data are left stored in the dual port memories, a dynamic image signal is reproduced and output using these data in the same manner as described above.

As described above, according to this embodiment, dynamic image data to be transmitted onto the ring-shaped wavelength-multiplexing transmission path is divided into a plurality of partial dynamic image signals, and these partial dynamic image signals are coded. Thereafter, these partial dynamic image signals are transmitted while assigning priority levels thereto. When a terminal on the transmission path must relay a large number of partial dynamic image signals, not only routing paths are selected depending on the data amount, as described above, but also signals are relayed in the order from higher to lower priority levels. Thus, the transmission band of the transmission path can be further effectively utilized.

When a predetermined delay time has lapsed for a partial dynamic image signal with a low priority level, the dynamic image data is abandoned, thus reducing the occurrence of generation of a waiting state for transmission requests of dynamic image signals. At the same time, when a receiving terminal has a possible reception wavelength different from the transmission wavelength of a transmitting terminal, the wavelength is changed by a terminal on the transmission path, thus improving response characteristics and avoiding disconnection of a dynamic image signal.

In this embodiment, a common wavelength is assigned to the reception wavelength and one of the two transmission wavelengths. However, the present invention is not limited to this. For example, different wavelengths may be assigned to the reception wavelength and the first and second transmission wavelengths. In this case, if a problem of access contention or the like occurs, the above-mentioned access contention avoiding means based on time-divisional multiplexing are properly provided.

(Fourth Embodiment)

The fourth embodiment of the present invention will be described below.

Figure 13:
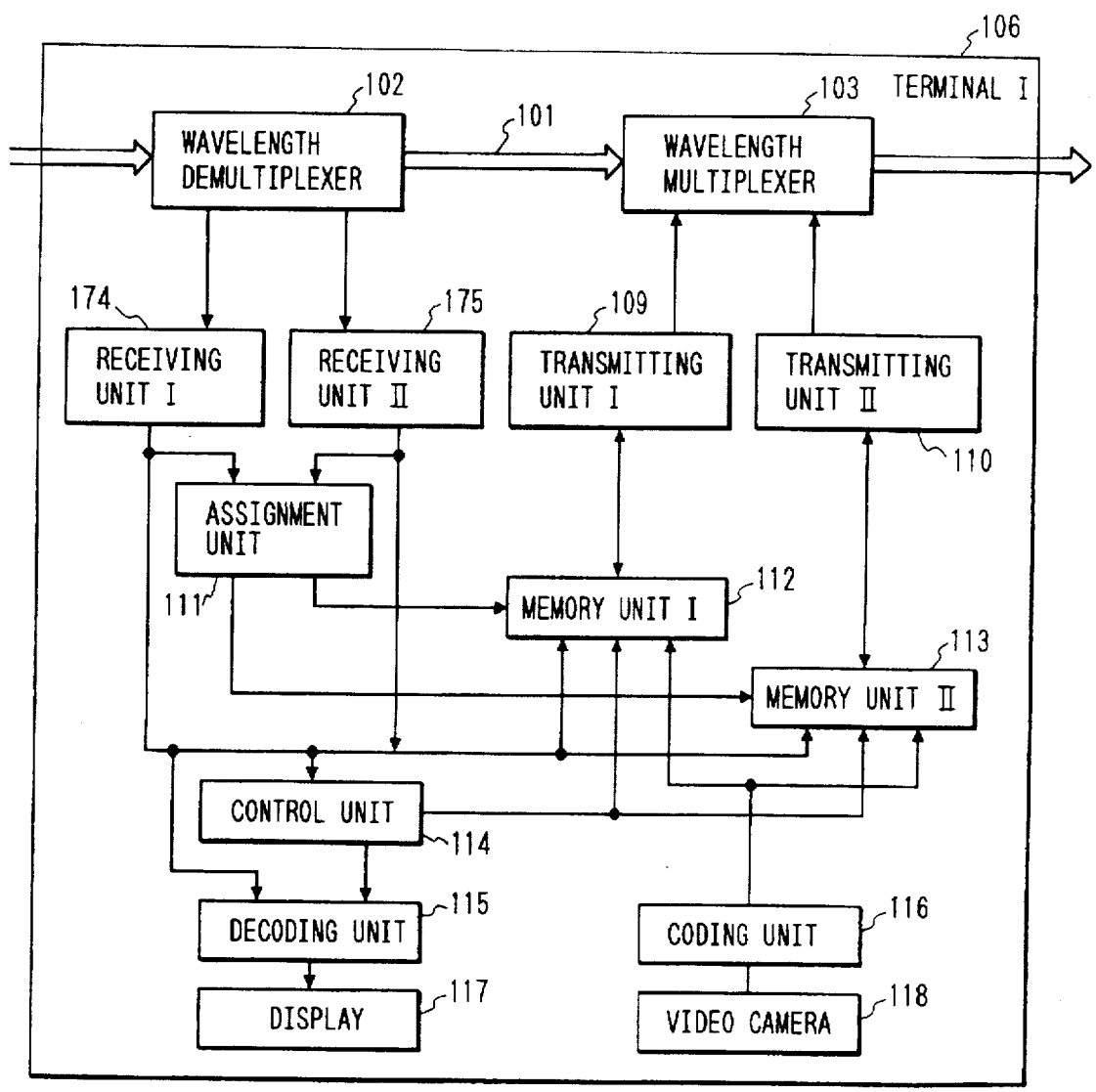
FIG. 13 is a diagram showing the arrangement of a terminal equipment according to the fourth embodiment of the present invention.

FIG. 13 is a block diagram showing the arrangement of a dynamic image network system according to the fourth embodiment of the present invention. FIG. 13 illustrates the arrangement adopted when a terminal I has two reception wavelengths. Note that the same reference numerals in FIG. 13 denote the same parts as in the system shown in FIG. 8. A wavelength demultiplexer 102 demultiplexes optical signals of two wavelengths which can be received by the own terminal, and outputs the demultiplexed signals to receiving units I 174 and II 175. The wavelength demultiplexer 102 passes optical signals of other wavelengths therethrough toward a wavelength multiplexer 103. At this time, since the optical signals of the two wavelengths as the reception wavelengths of the own terminal are demultiplexed and fetched in a total amount by the demultiplexer, they are shielded there, and are never output to the wavelength multiplexer 103.

The wavelengths are assigned, as shown in Table 3 below. In this embodiment, common wavelengths are assigned to two reception wavelengths and two transmission wavelengths of each terminal equipment.

TABLE 3

| Terminal | I | II | III | IV | V | VI | VII | VIII | IX | X | XI | XII |
|---|---|---|---|---|---|---|---|---|---|---|---|---|
| Reception Wavelength | $\lambda_1$ | $\lambda_1$ | $\lambda_1$ | $\lambda_2$ | $\lambda_2$ | $\lambda_2$ | $\lambda_3$ | $\lambda_3$ | $\lambda_3$ | $\lambda_4$ | $\lambda_4$ | $\lambda_4$ |
|  | $\lambda_2$ | $\lambda_3$ | $\lambda_4$ | $\lambda_1$ | $\lambda_3$ | $\lambda_4$ | $\lambda_1$ | $\lambda_2$ | $\lambda_4$ | $\lambda_2$ | $\lambda_2$ | $\lambda_3$ |
| Transmission Wavelength | $\lambda_1$ | $\lambda_1$ | $\lambda_1$ | $\lambda_2$ | $\lambda_2$ | $\lambda_2$ | $\lambda_3$ | $\lambda_3$ | $\lambda_3$ | $\lambda_4$ | $\lambda_4$ | $\lambda_4$ |
|  | $\lambda_2$ | $\lambda_3$ | $\lambda_4$ | $\lambda_1$ | $\lambda_3$ | $\lambda_4$ | $\lambda_1$ | $\lambda_2$ | $\lambda_4$ | $\lambda_1$ | $\lambda_2$ | $\lambda_3$ |

Referring to FIG. 13, the receiving unit I 175 receives an optical signal of the wavelength $\lambda_1$ output from the wavelength demultiplexer 102, and the receiving unit II 176 receives an optical signal of the wavelength $\lambda_2$ output from the wavelength demultiplexer 102.

Of the partial dynamic image signals received by the receiving units I and II, the transmission wavelength of a signal to be transferred is determined with reference to a second routing table (to be described later) stored in an assignment unit 111, and a transmission destination terminal address in the same manner as in the third embodiment, and this signal is temporarily stored in a memory unit I 112 or II 113 in accordance with the determined transmission wavelength. A control unit 114 performs reading control of the stored data in the same manner as in the third embodiment, and the readout data is transmitted from a transmitting unit I 109 or II 110 as an optical signal.

Table 4 below shows the second routing table. This routing table is one example in this embodiment. In this embodiment, for example, a partial dynamic image signal to be transmitted from the terminal I to the terminal IX is transmitted as an optical signal of the wavelength $\lambda_1$ from the terminal I. The transmitted optical signal is received by the terminal II, and is transmitted therefrom as an optical signal of the wavelength $\lambda_3$. Thereafter, the optical signal is received in turn by the terminals V, VII, and VIII, and is transmitted as an optical signal of the wavelength $\lambda_3$ again. Finally, the optical signal is received by the terminal IX.

TABLE 4

Second Routing Table

Transmission Destination Terminal

| | | I | II | III | IV | V | VI | VII | VIII | IX | X | XI | XII |
|---|---|---|---|---|---|---|---|---|---|---|---|---|---|
| | I | | $\lambda_1$ | $\lambda_1$ | $\lambda_2$ | $\lambda_2$ | $\lambda_1$ | $\lambda_2$ | $\lambda_1$ | $\lambda_1$ | $\lambda_2$ | $\lambda_1$ |
| | II | $\lambda_1$ | | $\lambda_1$ | $\lambda_1$ | $\lambda_3$ | $\lambda_1$ | $\lambda_1$ | $\lambda_3$ | $\lambda_1$ | $\lambda_1$ | $\lambda_3$ |
| T | III | $\lambda_1$ | $\lambda_1$ | | $\lambda_1$ | $\lambda_1$ | $\lambda_4$ | $\lambda_1$ | $\lambda_1$ | $\lambda_4$ | $\lambda_1$ | $\lambda_4$ | $\lambda_4$ |
| e | IV | $\lambda_1$ | $\lambda_1$ | | | $\lambda_2$ | $\lambda_2$ | $\lambda_1$ | $\lambda_2$ | $\lambda_1$ | $\lambda_1$ | $\lambda_2$ | $\lambda_1$ |
| r | V | $\lambda_1$ | $\lambda_1$ | $\lambda_1$ | | | $\lambda_2$ | $\lambda_3$ | $\lambda_2$ | $\lambda_3$ | $\lambda_2$ | $\lambda_2$ | $\lambda_3$ |
| m | VI | $\lambda_2$ | $\lambda_3$ | $\lambda_2$ | $\lambda_2$ | | | $\lambda_2$ | $\lambda_2$ | $\lambda_4$ | $\lambda_4$ | $\lambda_2$ | $\lambda_4$ |
| i | VII | $\lambda_2$ | $\lambda_2$ | $\lambda_4$ | $\lambda_2$ | $\lambda_2$ | | | $\lambda_3$ | $\lambda_3$ | $\lambda_1$ | $\lambda_1$ | $\lambda_3$ |
| n | VIII | $\lambda_1$ | $\lambda_1$ | $\lambda_1$ | $\lambda_1$ | $\lambda_3$ | $\lambda_1$ | | | $\lambda_3$ | $\lambda_3$ | $\lambda_2$ | $\lambda_3$ |
| a | IX | $\lambda_2$ | $\lambda_3$ | $\lambda_3$ | $\lambda_2$ | $\lambda_2$ | $\lambda_2$ | $\lambda_3$ | | | $\lambda_4$ | $\lambda_4$ | $\lambda_4$ |
| l | X | $\lambda_4$ | $\lambda_3$ | $\lambda_4$ | $\lambda_4$ | $\lambda_3$ | $\lambda_4$ | $\lambda_3$ | $\lambda_3$ | | | $\lambda_4$ | $\lambda_4$ |
| | XI | $\lambda_1$ | $\lambda_1$ | $\lambda_1$ | $\lambda_1$ | $\lambda_4$ | $\lambda_4$ | $\lambda_1$ | $\lambda_4$ | $\lambda_4$ | | | $\lambda_4$ |
| | XII | $\lambda_2$ | $\lambda_4$ | $\lambda_4$ | $\lambda_2$ | $\lambda_2$ | $\lambda_2$ | $\lambda_4$ | $\lambda_2$ | $\lambda_4$ | $\lambda_4$ | | |
| | XII | $\lambda_4$ | $\lambda_3$ | $\lambda_4$ | $\lambda_4$ | $\lambda_3$ | $\lambda_4$ | $\lambda_3$ | $\lambda_3$ | $\lambda_3$ | $\lambda_4$ | $\lambda_4$ | |

In this embodiment, since two reception wavelengths are used, the degree of freedom of the routing paths can be further increased, and the routing paths can be changed in accordance with the waiting states in the memory units I and II, thus shortening the transmission delay time.

Furthermore, this embodiment does not require any access contention avoiding means such as time-divisional multiplexing since it is free from access contention, i.e., an interference of optical signals of the same wavelength concurrently transmitted from a plurality of terminals in the receiving unit unlike in the third embodiment. This is for the following reasons. That is, each terminal has the same numbers of transmission and reception wavelengths, and an optical signal to be received by the own terminal of those transmitted from the upstream side is demultiplexed by the wavelength demultiplexer 102 to only the receiving unit of the own terminal and is shielded not to be transmitted to downstream terminals beyond the wavelength multiplexer 103. Therefore, an interference with an optical signal transmitted from the own terminal never occurs.

Note that a dynamic image network system which includes both the two-wavelength reception terminals of this embodiment and the one-wavelength reception terminals of the third embodiment can be constituted. In this case, when a larger number of transmission/reception wavelengths are assigned to high-function terminals, and a smaller number of transmission/reception wavelengths are assigned to low-function terminals, a system can be constituted in correspondence with the functions of the terminals.

Figure 14:
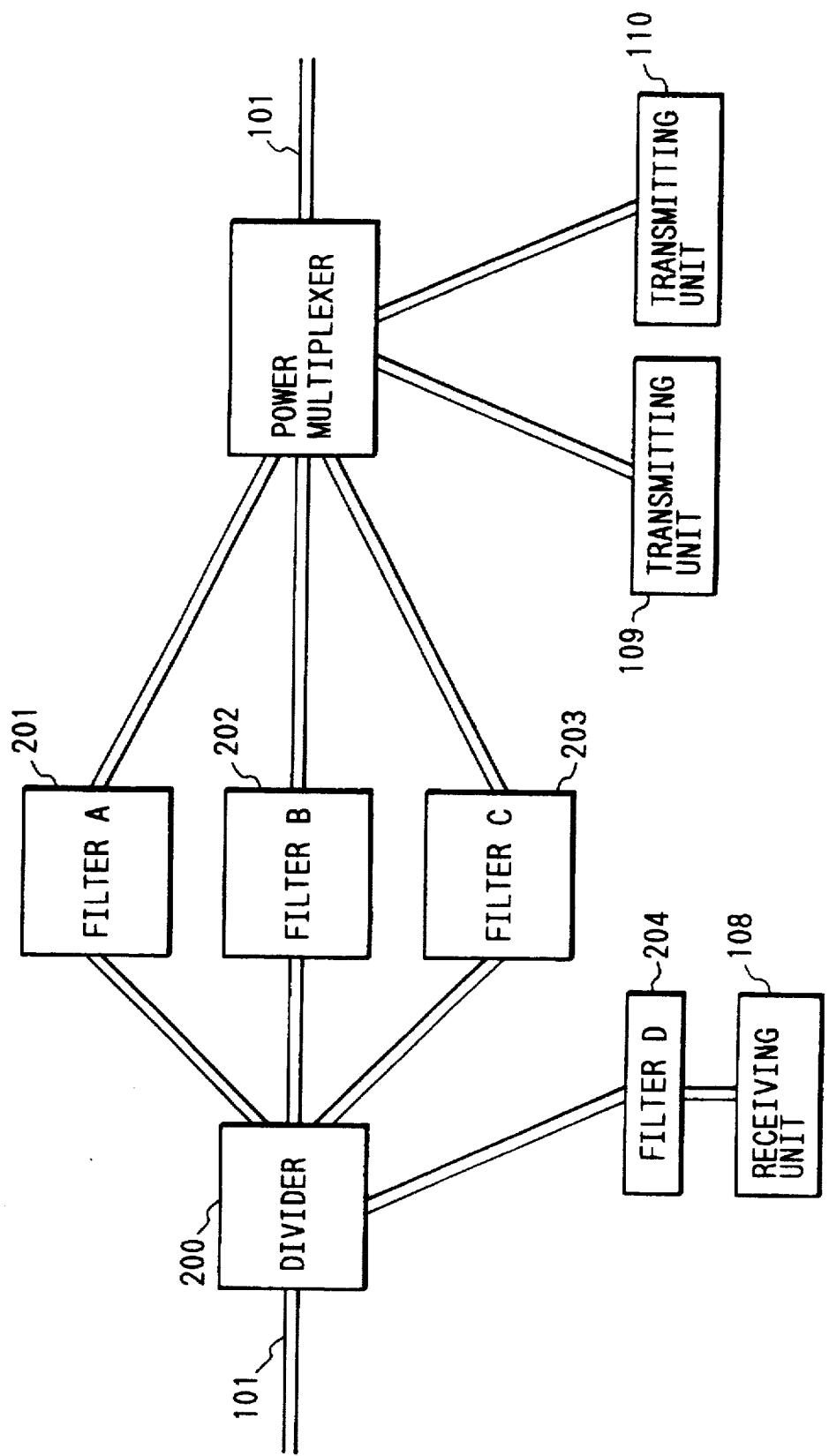
FIG. 14 is a diagram showing a modification of the third embodiment.
Figure 15:
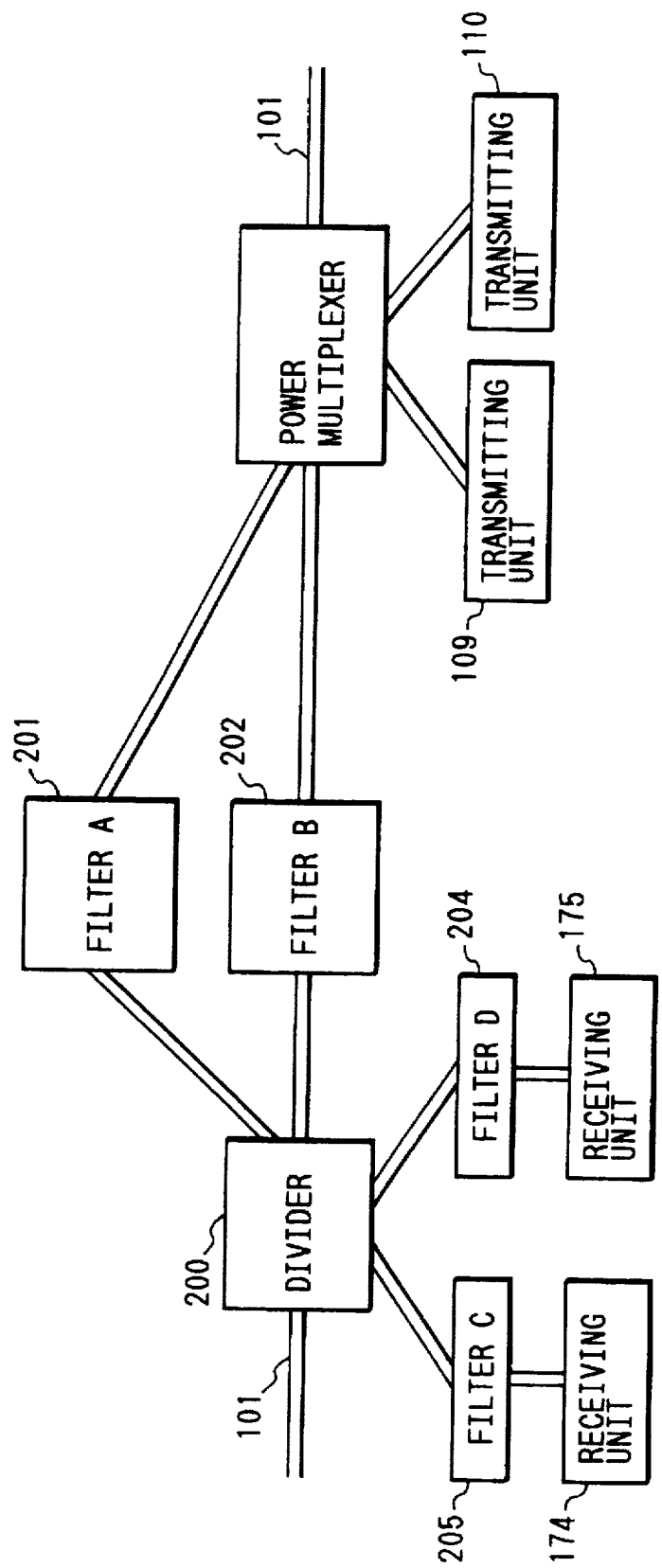
FIG. 15 is a diagram showing a modification of the fourth embodiment.

In each of the third and fourth embodiments, an optical signal is fetched and shielded using a wavelength demultiplexer. However, the present invention is not limited to this. For example, as a modification of the third embodiment, the following method may be used. That is, as shown in FIG. 14, an optical signal on the wavelength-multiplexing transmission path 101 is divided using a divider 200 independently of wavelengths, and an optical signal of the reception wavelength is received by extracting it from the divided optical signals using a filter D 204 which passes only the reception wavelength therethrough. At the same time, the optical signal of the reception wavelength is shielded from other divided optical signals using filters A, B, and C (201, 202, and 203) each for passing a corresponding one of wavelengths other than the reception wavelength therethrough. Alternatively, cut filters for shielding only the reception wavelength may also be used in place of the filters A, B, and C As a modification of the fourth embodiment, the arrangement shown in FIG. 15 may be adopted to cope with two reception wavelengths. Since a wavelength demultiplexer requires relatively higher cost than a divider and filters, the system cost can be further reduced by the arrangements shown in FIGS. 14 and 15. More specifically, in each of the systems of the third and fourth embodiments, an optical signal, which is transmitted from an upstream terminal equipment and has the reception wavelength of the own terminal equipment, need only be shielded so as not to be output to downstream terminal equipments.

The present invention as not limited to a coding method adopted in the above embodiment, and a hierarchical coding method such as a DCT hierarchical coding method may be used.

The present invention may be applied to either a system constituted by a plurality of devices or an apparatus comprising a single device. Also, the present invention may be applied to a case wherein the invention is achieved by supplying a program to the system or apparatus, as a matter of course.

As described above, according to the third and fourth embodiments, since image data is transmitted based on the dynamic image data transmission priority order and the allowable transmission delay time so as to minimize the delay time, a queue of transmission requests can be prevented from being formed, and response characteristics can be improved.

Furthermore, according to the present invention, in an n-wavelength-multiplexing ($n \geq 3$) optical transmission path, communications among all terminals can be realized by a simple terminal arrangement using only a small number ($<n$) of fixed-wavelength transmission/reception means without using a device such as a tunable laser which requires a complicated control mechanism such as temperature control means. In addition, since a plurality of terminals are allowed to simultaneously perform transmission at the same wavelength, the transmission capacity of the transmission path can be increased, and the delay of the start of communications caused by preliminary communications with a server such as communication permission/inhibition, assignment of use wavelengths, and the like can be prevented. Therefore, a large-capacity transmission path which is suitable for large-capacity continuous data such as a dynamic image can be provided.

What is claimed is:

1. A terminal equipment used in a network system constituted by a wavelength-multiplexing transmission path for multiplexing and transmitting a plurality of wavelengths, and a plurality of terminal equipments connected to said transmission path, comprising:

passing/fetching means which can select whether an optical signal transmitted from another terminal equipment and having a reception wavelength previously assigned to said terminal equipment among optical signals of a plurality of wavelengths on said wavelength-multiplexing transmission path is fetched into said terminal equipment and is intercepted from said wavelength-multiplexing transmission path, or is caused to pass through said terminal equipment without intercepting from said wavelength-multiplexing transmission path;

receiving means for receiving the optical signal of the reception wavelength which is fetched by said passing/fetching means; and transmitting means for transmitting a signal to be transmitted onto said wavelength-multiplexing transmission path.

2. An equipment according to claim 1, wherein the reception wavelength is set to be different from the transmission wavelength.

3. An equipment according to claim 1, wherein said passing/fetching means comprises:
   wavelength demultiplexing means for demultiplexing the optical signal of the reception wavelength from the optical signals of the plurality of wavelengths on said wavelength-multiplexing transmission path;
   wavelength multiplexing means for multiplexing an optical signal onto said wavelength-multiplexing transmission path; and
   switching means which can select whether the demultiplexed optical signal of the reception wavelength is to be output to said receiving means side or said wavelength multiplexing means side.

4. An equipment according to claim 1, wherein said passing/fetching means comprises:
   dividing means for dividing optical signals of a plurality of wavelengths on said wavelength-multiplexing transmission path into at least three signals independently of wavelengths;
   means for extracting an optical signal of the reception wavelength from the divided first signal, and outputting the extracted signal to said receiving means;
   means for extracting an optical signal of the reception wavelength from the divided second signal, and capable of selecting whether or not the extracted optical signal is output onto said wavelength-multiplexing transmission path; and
   means for intercepting the optical signal of the reception wavelength from the remaining divided signals, and outputting optical signals of other wavelengths onto said wavelength-multiplexing transmission path.

5. An equipment according to claim 1, wherein an optical signal, which need not be received by said terminal equipment, of optical signals of the reception wavelength transmitted along said wavelength-multiplexing transmission path is caused to pass by said passing/fetching means.

6. A network system comprising:
   a wavelength-multiplexing transmission path for multiplexing and transmitting a plurality of wavelengths;
   control arbitration means for permitting/inhibiting communications among a plurality of terminal equipments connected to said wavelength-multiplexing transmission path, and controlling operations of said terminal equipments; and
   a plurality of terminal equipments connected to said wavelength-multiplexing transmission path, each of said terminal equipments comprising:
   passing/fetching means which can select whether an optical signal transmitted from another terminal equipment and having a reception wavelength previously assigned to said terminal equipment among optical signals of a plurality of wavelengths on said wavelength-multiplexing transmission path is fetched into said terminal equipment and is intercepted from said wavelength-multiplexing transmission path, or is caused to pass through said terminal equipment without intercepting from said wavelength-multiplexing transmission path;
   receiving means for receiving the optical signal of the reception wavelength which is fetched by said passing/fetching means; and
   transmitting means for transmitting, a signal to be transmitted onto said wavelength-multiplexing transmission path.

7. A system according to claim 6, wherein in at least some of said plurality of terminal equipments, the reception wavelength is set to be different from the transmission wavelength.

8. A system according to claim 7, wherein when a transmission wavelength of a first terminal equipment for transmitting data is different from a reception wavelength of a second terminal equipment which is to receive the data, wavelength conversion is performed in a terminal equipment other than the first and second terminal equipments, which device has transmission and reception wavelengths that are different from each other.

9. A communication method for a network system which comprises a wavelength-multiplexing transmission path for multiplexing and transmitting a plurality of wavelengths, a plurality of terminal equipments which are connected to said transmission path and to each of which reception and transmission wavelengths are assigned in advance, and control arbitration means for permitting/inhibiting communications among said plurality of terminal equipments connected to said wavelength-multiplexing transmission path, and controlling said plurality of terminal equipments, comprising the steps of:
   issuing a transmission path acquisition request, to said control arbitration means, from the terminal equipment which must transmit data, and in which the transmission path acquisition request is generated;
   setting, in said control arbitration means which received the transmission path acquisition request, a transmission path on the basis of results of examining, based on a first condition concerning the transmission wavelength of the terminal equipment as a transmission source of the data, the reception wavelength of the terminal equipment as a destination of the data, the reception and transmission wavelengths of a terminal equipment present between the two terminal equipments, and a use state of said wavelength-multiplexing transmission path, a second condition concerning whether or not wavelength conversion for temporarily receiving the data by a terminal equipment between the transmission source terminal equipment and the destination terminal equipment and transmitting the received data at another wavelength must be performed, based on said first condition and a third condition in which of the terminal equipments the wavelength conversion is performed if the wavelength conversion must be performed;
   sending a transmission path acquisition inhibition message from said control arbitration means to the terminal equipment which issued the transmission path acquisition request when it is impossible for said control arbitration means to set the transmission path; and
   executing the following control operations in said control arbitration means for the terminal equipments on the transmission path when it is possible for said control arbitration means to set the transmission path,
   (a) sending a transmission instruction to the transmission source terminal equipment,
   (b) controlling the destination terminal equipment to receive data transmitted from an upstream side of the transmission path at the reception wavelength of the destination terminal equipment by fetching and intercepting the data from the transmission path;
   (c) controlling the terminal equipment which is to execute the wavelength conversion to temporarily receive the data by fetching and intercepting the data from the transmission path, and to transmit the received data at another wavelength when it is determined on the basis of results of examining that the wavelength conversion must be performed; and (d) controlling the terminal equipments which are located along the transmission path of the data transmitted at the reception wavelength of the terminal equipments from an upstream side and do not execute the wavelength conversion to pass the data therethrough without fetching the data.

10. A terminal equipment used in a network system constituted by a wavelength-multiplexing transmission path for multiplexing and transmitting a plurality of wavelengths, and a plurality of terminal equipments connected to said transmission path, comprising:

fetching means for fetching an optical signal of a reception wavelength, previously assigned to said terminal equipment among optical signals of a plurality of wavelengths on said wavelength-multiplexing transmission path, and intercepting the fetched optical signal from said wavelength-multiplexing transmission path, optical signals of wavelengths other than the reception wavelength previously assigned being not fetched by said fetching means and being passed therethrough;

receiving means for receiving the fetched optical signal of the reception wavelength;

first transmitting means for transmitting data at a first transmission wavelength previously assigned to said terminal equipment;

second transmitting means for transmitting data at a second transmission wavelength, different from the first transmission wavelength, previously assigned to said terminal equipment;

memory means for storing data to be transmitted, said data to be transmitted being the optical signal received by said receiving means and/or is the signal to be transmitted from said terminal equipment, in said memory means, said signal to be transmitted being classified into a signal to be transmitted with said first transmission wavelength and a signal to be transmitted with said second transmission wavelength and being stored; and transmission wavelength determining means for determining whether the data to be transmitted is transmitted at the first or second transmission wavelength.

11. An equipment according to claim 10, wherein at least one of the first and second transmission wavelengths is different from the reception wavelength.

12. An equipment according to claim 10, wherein when said transmission wavelength determining means determines the transmission wavelength at which the data to be transmitted is transmitted, said transmission wavelength determining means determines the transmission wavelength for use in transmission with reference to amounts of data on the basis of transmission wavelengths, which data are stored in said memory means and for which the transmission wavelengths have already been determined.

13. An equipment according to claim 10, wherein, of the data stored in said memory means, data with a high priority level is transmitted prior to data with a low priority level.

14. An equipment according to claim 10, wherein, of the data stored in said memory means, data whose allowable delay time which is determined in units of data and has expired is abandoned without being transmitted.

15. An equipment according to claim 10, wherein said fetching means fetches an optical signal of the reception wavelength and intercepts the fetched optical signal from the wavelength-multiplexing transmission path, such that said fetching means demultiplexes an optical signal of the reception wavelength from optical signals of a plurality of wavelengths and fetches the optical signal in a total amount using a wavelength demultiplexer.

16. An equipment according to claim 10, wherein said fetching means fetches an optical signal of the reception wavelength and intercepts the fetched optical signal from the wavelength-multiplexing transmission path, such that said fetching means divides optical signals of a plurality of wavelengths on said wavelength-multiplexing transmission path into at least two signals using a divider, fetches the optical signal of the reception wavelength by extracting the optical signal of the reception wavelength from a first optical signal of the divided optical signals, extracts optical signals of wavelengths other than the reception wavelength from the divided optical signal other than the first optical signal, and returns the extracted optical signals onto said wavelength-multiplexing transmission path.

17. An equipment according to claim 10, wherein at least one of the first and second transmission wavelengths is common to the reception wavelength.

18. A network system comprising:

a wavelength-multiplexing transmission path for multiplexing and transmitting a plurality of wavelengths; and a plurality of terminal equipments connected to said transmission path, each of said plurality of terminal equipments comprising:

fetching means for fetching an optical signal of a reception wavelength, previously assigned to each of said plurality of terminal equipments among optical signals of a plurality of wavelengths on said wavelength-multiplexing transmission path, and intercepting the fetched optical signal from said wavelength-multiplexing transmission path, optical signals of wavelengths other than the reception wavelength previously assigned being not fetched by said fetching means and being passed therethrough;

receiving means for receiving the fetched optical signal of the reception wavelength;

first transmitting means for transmitting data at a first transmission wavelength previously assigned to each of said plurality of terminal equipments;

second transmitting means for transmitting data at a second transmission wavelength, different from the first transmission wavelength, previously assigned to each of said plurality of terminal equipments;

memory means for storing data to be transmitted, said data to be transmitted being the optical signal received by said receiving means and/or is the signal to be transmitted from said terminal equipment, in said memory means, said signal to be transmitted being classified into a signal to be transmitted with said first transmission wavelength and a signal to be transmitted with said second transmission wavelength and being stored; and transmission wavelength determining means for determining whether the data to be transmitted is transmitted at the first or second transmission wavelength.

19. A system according to claim 18, wherein when the transmission wavelength of a first terminal equipment for transmitting data is different from the reception wavelength of a second terminal equipment which is to receive the data, wavelength conversion is performed in a terminal equipment other than the first and second terminal equipments.

20. A terminal equipment used in a network system constituted by a wavelength-multiplexing transmission path for multiplexing and transmitting a plurality of wavelengths, and a plurality of terminal equipments connected to said transmission path, comprising:

receiving means for receiving optical signals of two or more reception wavelengths, previously assigned to said terminal equipment among optical signals of a plurality of wavelengths on said wavelength-multiplexing transmission path by fetching and intercepting the optical signals of the two or more reception wavelengths from said wavelength-multiplexing transmission path, optical signals of wavelengths other than said two or more reception wavelengths previously assigned being not fetched by said receiving means and being passed therethrough, said receiving means comprising means for independently receiving the two or more reception wavelengths;

transmitting means for transmitting data at two or more transmission wavelengths previously assigned to said terminal equipment, said transmitting means comprising means for independently transmitting the two or more transmission wavelengths;

memory means for storing data to be transmitted, said data to be transmitted being the signal received by said receiving means and/or the signal to be transmitted from said terminal equipment, in said memory means, said signal to be transmitted being classified into the respective wavelengths of the two or more transmission wavelengths and being stored; and transmission wavelength determining means for determining the transmission wavelength for transmitting the data from the two or more transmission wavelengths.

21. An equipment according to claim 20, wherein when said transmission wavelength determining means determines the transmission wavelength at which the data to be transmitted is transmitted, said transmission wavelength determining means determines the transmission wavelength for use in transmission with reference to amounts of data on the basis of transmission wavelengths, which data are stored in said memory means and for which the transmission wavelengths have already been determined.

22. An equipment according to claim 20, wherein, of the data stored in said memory means, data with a high priority level is transmitted prior to data with a low priority level.

23. An equipment according to claim 20, wherein, of the data stored in said memory means, data whose allowable delay time which is determined in units of data and has expired is abandoned without being transmitted.

24. An equipment according to claim 20, wherein said receiving means comprises a wavelength demultiplexer, and fetches optical signals of the two or more reception wavelengths and intercepts the fetched optical signals from the wavelength-multiplexing transmission path, such that said receiving means demultiplexes optical signals of the two or more reception wavelengths from optical signals of a plurality of wavelengths and fetches the optical signals in a total amount.

25. An equipment according to claim 20, wherein said receiving means comprises a divider, and fetches optical signals of the two or more reception wavelengths and intercepts the fetched optical signals from the wavelength-multiplexing transmission path, such that said receiving means divides optical signals of a plurality of wavelengths on said wavelength-multiplexing transmission path into at least two signals, fetches the optical signals of the two or more reception wavelengths by extracting the optical signals of the two or more reception wavelengths from a first optical signal of the divided optical signals, extracts optical signals of wavelengths other than the two or more reception wavelengths from the divided optical signal other than the first optical signal, and returns the extracted optical signals onto said wavelength-multiplexing transmission path.

26. An equipment according to claim 20, wherein the number of the two or more reception wavelengths is equal to the number of the two or more transmission wavelengths, and the same numbers of reception and transmission wavelengths use common wavelengths.

27. A network system comprising:

a wavelength-multiplexing transmission path for multiplexing and transmitting a plurality of wavelengths; and a plurality of terminal equipments connected to said transmission path, each of said plurality of terminal equipments comprising:

receiving means for receiving optical signals of two or more reception wavelengths, previously assigned to each of said plurality of terminal equipments among optical signals of a plurality of wavelengths on said wavelength-multiplexing transmission path by fetching and intercepting the optical signals of the two or more reception wavelengths from said wavelength-multiplexing transmission path, optical signals of wavelengths other than said two or more reception wavelengths previously assigned being not fetched by said receiving means and being passed therethrough, said receiving means comprising means for independently receiving the two or more reception wavelengths;

transmitting means for transmitting data at two or more transmission wavelengths previously assigned to each of said plurality of terminal equipments, said transmitting means comprising means for independently transmitting the two or more transmission wavelengths;

memory means for storing data to be transmitted, said data to be transmitted being the signal received by said receiving means and/or the signal to be transmitted from said terminal equipment, in said memory means said signal to be transmitted being classified into the respective wavelengths of the two or more transmission wavelengths and being stored; and transmission wavelength determining means for determining the transmission wavelength for transmitting the data from the two or more transmission wavelengths.

28. A system according to claim 27, wherein when the transmission wavelength of a first terminal equipment for transmitting data is different from the reception wavelength of a second terminal equipment which is to receive the data, wavelength conversion is performed in a terminal equipment other than the first and second terminal equipments.

* * * * *

UNITED STATES PATENT AND TRADEMARK OFFICE
CERTIFICATE OF CORRECTION

PATENT NO. : 5,699,177
DATED : December 16, 1997
INVENTOR(S) : Yamamoto

It is certified that error appears in the above-identified patent and that said Letters Patent is hereby corrected as shown below:

On the title page:

[56] References Cited:

Under "OTHER PUBLICATIONS",

"TeraNet;" should read --TeraNet:--; and
"Anthony S." should read --Anthony S. Acampora--.

[57] ABSTRACT:

Line 10, "diffenrent" should read --different--.

COLUMN 4:

Line 11, "to" should read --to the--.

COLUMN 8:

Line 24, "$\lambda_s,$" should read --$\lambda_s$--.

COLUMN 10:

Line 48, "$\lambda_r = \lambda_2\ 1.50$" should read --$\lambda_r = \lambda_2 = 1.50$--.

UNITED STATES PATENT AND TRADEMARK OFFICE
CERTIFICATE OF CORRECTION

PATENT NO. : 5,699,177               Page 2 of 3
DATED      : December 16, 1997
INVENTOR(S) : Yamamoto It is certified that error appears in the above-identified patent and that said Letters Patent is hereby corrected as shown below:

COLUMN 11:

Line 12, "$\lambda_3 1.60$" should read --$\lambda_3 = 1.60$--.

COLUMN 12:

Line 48, "$\lambda_3 1.60$" should read --$\lambda_3 = 1.60$--.

COLUMN 16:

Line 6, Table 2, first entry under Transmission
      Destination Terminal III, "$\lambda_2$" should read --$\lambda_1$--;
   Line 18, "of" should read --of the--;
   Line 21, "routine" should read --routing--;
   Line 22, "as" should read --as an--; and
   Line 27, "of" should read --of the--.

COLUMN 17:

Line 27, "quantizers" should read --Quantizers--.

COLUMN 24:

Line 41, Table 3, second entry under Terminal X,
   "$\lambda_2$" should read --$\lambda_1$--.

UNITED STATES PATENT AND TRADEMARK OFFICE
CERTIFICATE OF CORRECTION

PATENT NO. : 5,699,177  Page 3 of 3
DATED : December 16, 1997
INVENTOR(S) : Yamamoto It is certified that error appears in the above-identified patent and that said Letters Patent is hereby corrected as shown below:

COLUMN 25:

Line 67, "falters" should read --filters--.

Signed and Sealed this

Twenty-eighth Day of July, 1998

Attest:

BRUCE LEHMAN

*Attesting Officer*  *Commissioner of Patents and Trademarks*